United States Patent
Braun et al.

(10) Patent No.: US 12,457,602 B2
(45) Date of Patent: Oct. 28, 2025

(54) SCHEDULING IN WIRELESS COMMUNICATION NETWORKS

(71) Applicant: NOKIA SOLUTIONS AND NETWORKS OY, Espoo (FI)

(72) Inventors: Volker Braun, Stuttgart (DE); Bernd Haberland, Stuttgart (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/602,559

(22) Filed: Mar. 12, 2024

(65) Prior Publication Data
US 2024/0224262 A1    Jul. 4, 2024

Related U.S. Application Data

(62) Division of application No. 17/055,277, filed as application No. PCT/EP2018/062770 on May 16, 2018, now Pat. No. 11,956,771.

(51) Int. Cl.
*H04W 72/04* (2023.01)
*H04W 72/0446* (2023.01)
(Continued)

(52) U.S. Cl.
CPC ............ *H04W 72/1263* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

| | | |
|---|---|---|
| 2008/0080465 A1 | 4/2008 | Pajukoski et al. |
| 2015/0358121 A1 | 12/2015 | Sun et al. |
| 2017/0265169 A1 | 9/2017 | Chen et al. |
| 2018/0049097 A1* | 2/2018 | Chen .................. H04L 1/0003 |
| 2019/0222364 A1* | 7/2019 | Shimoda .............. H04L 1/1887 |

OTHER PUBLICATIONS

ZTE: "The peak bitrate requirement for different split options", 3GPP Draft; R3-161219, 3rd Generation Partnership Project (3GPP), Mobile Competence Centre; 650, Route Des Lucioles; F-06921 Sophia-Antipolis Cedex; France, vol. RAN WG3, no. Nanjing, China; May 23, 2016-May 27, 2016 May 13, 2016. Per MPEP 609. Copy submitted in parent U.S. Appl. No. 17/055,277.

(Continued)

*Primary Examiner* — Willie J Daniel, Jr.
(74) *Attorney, Agent, or Firm* — SQUIRE PATTON BOGGS (US) LLP

(57) ABSTRACT

A method is disclosed including receiving data transmissions indicative of data to be transmitted via the wireless communication network and obtaining physical channel information indicative of one or more parameters representing channel information and/or quality information associated with at least one physical channel used for transmitting the data transmissions to one or more mobile devices of the wireless communication network. The method also includes scheduling the data transmissions based at least partially on the physical channel information. A tentative scheduling grant is determined for at least a part of the data transmissions to be encoded tentatively. The method also includes encoding at least a part of the data transmissions, which is performed and/or controlled in a tentatively upon reception of the data transmissions, and the data transmissions are encoded based on the tentative scheduling grant. The method further includes outputting the encoded data transmissions upon completion of the encoding.

11 Claims, 8 Drawing Sheets

(51) Int. Cl.
*H04W 72/0453* (2023.01)
*H04W 72/1263* (2023.01)
*H04W 72/23* (2023.01)
*H04W 72/50* (2023.01)
*H04W 72/54* (2023.01)

(52) U.S. Cl.
CPC ......... *H04W 72/23* (2023.01); *H04W 72/535* (2023.01); *H04W 72/54* (2023.01)

(56) References Cited

OTHER PUBLICATIONS

Communication pursuant to Article 94(3) EPC dated Nov. 23, 2022, corresponding to European Patent Application No. 18726413.0. No copy provided, Per MPEP 609. Copy submitted in parent U.S. Appl. No. 17/055,277.

International Search Report and Written Opinion dated Jan. 23, 2019 corresponding to International Patent Application No. PCT/EP2018/062770. Per MPEP 609. Copy submitted in parent U.S. Appl. No. 17/055,277.

NTT Docomo et al: "CU-DU interface: U-plane aspects," 3GPP Draft; R3-170620, TSG-RAN Working Group 3 meeting #95, Athens, Greece, Feb. 7, 2017, XP051224382. Per MPEP 609. Copy submitted in parent U.S. Appl. No. 17/055,277.

Nokia et al: "TP of Clean up for functional split," 3GPP Draft; R3-170416, 3GPP TSG-RAN WG3 Meeting #95, Athens, Greece, Feb. 12, 2017, XP051213006. Per MPEP 609. Copy submitted in parent U.S. Appl. No. 17/055,277.

Communication pursuant to Article 94(3) EPC dated Mar. 12, 2025 corresponding to European Patent Application No. 18726413.0.

\* cited by examiner

SCHEDULING IN WIRELESS COMMUNICATION NETWORKS

CROSS-REFERENCE TO RELATED APPLICATIONS

This is a divisional application of U.S. patent application Ser. No. 17/055,277, filed on Nov. 13, 2020, which is the U.S. national stage entry of International Patent Application No. PCT/EP2018/062770, filed on May 16, 2018. The disclosures of the prior applications are hereby incorporated by reference in their entirety.

FIELD

The following disclosure relates to the field of wireless communication networks, or more particularly relates to systems, apparatuses, and methods for enhancing the scheduling of data transmissions, in particular in CRAN (Centralized RAN (Radio Access Network) architectures.

BACKGROUND

CRAN architectures are used in e.g. wireless communication networks, e.g. cellular communication networks according to LTE (Longterm Evolution) standard, and/or future cellular communication networks, also referred to as NR (New Radio) communication technologies.

CRAN architectures provide the ability to centralize base station functions for a large number of mobile devices (e.g. terminals) into a single location. Such base stations as used by CRAN architectures, are also referred to as gNB (Next Generation NodeB) and comprise a centralized unit and one or more distributed units. This enables a functional split for scheduling of data transmissions to be performed between the centralized unit and the one or more distributed units of such base stations. Having centralized scheduling can provide benefits e.g. for interference management and coordinated transmission in multiple cells enabled by such base stations. For instance, this enables to re-use the frequency spectrum many times within a provided coverage area of a base station enabling radio transmission e.g. to one or more mobile devices of a single cell.

SUMMARY OF SOME EXEMPLARY EMBODIMENTS

However, there are some drawbacks in this scheduling approach. For instance, in order to provide efficient scheduling, information with respect to the scheduling need to be coordinated between the centralized unit and the one or more distributed units. Communication between the centralized unit and the one or more distributed units is enabled e.g. over a midhaul interface between the centralized unit and the one or more distributed units. Scheduling information needs to be carried at least twice over the midhaul interface in order to coordinate the scheduling between the centralized unit and the one or more distributed units. This in particular reduces the available latency budget for necessary processing operations in order to enable high data bandwidth.

It is thus, inter alia, an object of the invention to enhance a scheduling for data transmissions in telecommunication networks, in particular to minimize latency.

According to a first exemplary aspect of the present invention, a first method is disclosed, the method comprising:

receiving data transmissions indicative of data to be transmitted via the wireless communication network;

obtaining physical channel information indicative of one or more parameters representing channel information and/or quality information associated with at least one physical channel that can be used for transmitting the data transmissions to one or more mobile devices of the wireless communication network;

scheduling the data transmissions based at least partially on the physical channel information, wherein a tentative scheduling grant is determined for at least a part of the data transmissions to be encoded tentatively;

encoding at least a part of the data transmissions, wherein the encoding is performed and/or controlled in a tentative fashion upon reception of the data transmissions, wherein the data transmissions are encoded based on the tentative scheduling grant; and outputting the encoded data transmissions upon completion of the encoding.

This method may for instance be performed and/or controlled by an apparatus, for instance a centralized unit of a base station (e.g. a gNB). Alternatively, this method may be performed and/or controlled by more than one apparatus, for instance a server cloud enabling the centralized unit, comprising at least two servers performing and/or controlling the method at least partially jointly.

According to a further exemplary aspect of the invention, a computer program is disclosed, the computer program when executed by a processor causing an apparatus, for instance the centralized unit, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a second method is disclosed, the method comprising:
  receiving data transmissions, wherein the data transmissions are encoded;
  buffering the encoded data transmissions;
  scheduling the data transmissions to be transferred to at least one mobile device, wherein the data transmissions are scheduled based at least partially on a Transmission Time Interval (TTI)-by-Transmission Time Interval basis, wherein the scheduling is performed and/or controlled upon reception of the data transmissions; and
  transmitting the data transmissions based on the scheduling upon completion of the scheduling for the at least one cell.

This method may for instance be performed and/or controlled by an apparatus, for instance a distributed unit of a base station (e.g. a gNB). This base station may for instance be the same base station comprising the centralized unit that performs and/or control the method according to the first exemplary aspect of the present invention. Alternatively, this method may be performed and/or controlled by more than one apparatus, for instance a server cloud enabling the distributed unit, comprising at least two servers performing and/or controlling the method at least partially jointly.

According to a further exemplary aspect of the invention, a computer program is disclosed, the computer program when executed by a processor causing an apparatus, for instance the distributed unit, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:
  at least one first apparatus performing and/or controlling the method according to the first exemplary aspect of the present invention as disclosed above; and
  at least one second apparatus performing and/or controlling the method according to the second exemplary aspect of the present invention as disclosed above.

The at least one first apparatus and the at least one second apparatus may for instance be comprised by or be a part of a single base station (e.g. a gNB). Alternatively, the at least one first apparatus and the at least one second apparatus may for instance be connected to each other, e.g. over a midhaul communication. Alternatively, at least one first apparatus and the at least one second apparatus may for instance be comprised by or be a part of a single hardware device. The at least one first apparatus and the at least one second apparatus may for instance enable a functional split between the at least one first apparatus (e.g. centralized unit) and the at least one second apparatus (e.g. distributed unit), wherein e.g. the encoding in a tentative fashion and the scheduling, wherein a tentative scheduling grant is determined, is performed by the at least one first apparatus (e.g. centralized unit) prior to the scheduling, wherein e.g. time-frequency resources are assigned to the data transmission, that is performed by the at least one second apparatus (e.g. distributed unit).

In the following, exemplary features and exemplary embodiments of all aspects of the present invention will be described in further detail.

The centralized unit may for instance be comprised by or be a part of a base station (e.g. a gNB). The wireless communication network may for instance be a cellular communication network according to e.g. LTE communication standard or NR communication technologies (also referred to as future radio technologies). The gNB may for instance be comprised by or be a part of a CRAN architecture of the wireless communication network. The wireless communication network may for instance perform OFDM (Orthogonal frequency-division multiplexing) for data transmissions (e.g. for uplink and/or downlink transmissions).

Such a base station (e.g. a gNB) comprises at least one centralized unit and one or more distributed units, wherein the centralized unit of the base station e.g. manages and/or controls the one or more distributed units. Further, the base station, as a part of the CRAN architecture enables to perform a functional split between the centralized unit and the one or more distributed units. Such a functional split as used herein e.g. refers to a single base station (e.g. a gNB) with one centralized unit and one or more distributed units so that some functions of the base station can be performed and/or controlled by the centralized unit and other functions of the base station can be performed and/or controlled by the distributed unit(s).

The communication between the at least one first apparatus (e.g. centralized unit) and the at least one second apparatus (e.g. distributed unit) may for instance be a so-called midhaul communication. 'Midhaul' as used herein refers to a network between base station sites of the wireless communication network, in particular when at least one site is a small cell site, also referred to as a 'cell'.

The method according to all aspects of the present invention may in particular be used in downlink transmission processing (e.g. downlink transmission(s)) performed and/or controlled in the base station(s) (e.g. gNBs) comprised by the wireless communication network (e.g. a CRAN architecture).

The data transmissions are received, e.g. from one or more respective mobile devices, from the wireless network, from an application server, to name but a few non-limiting examples. The received data transmissions may for instance be requested to be transmitted to the respective mobile devices. Such mobile devices may for instance be registered and/or logged in at the at least one cell comprising or being deployed by base station (e.g. a gNB).

Additionally or alternatively, the received data transmissions may for instance be requested to be transmitted to a specific entity that is connected via the wireless communication network to the respective mobile device. In particular, the received data transmissions may for instance be downlink data transmissions to a respective mobile device.

The mobile device may for instance be portable, e.g. weigh less than 2, 1, or 0.5 kg. The mobile device may for instance comprise or be connectable to a display, e.g. for displaying information that are presented to a user of the mobile device. The information may for instance represent visual and/or acoustic content. The mobile device may for instance comprise or be connectable to means for outputting sound, e.g. in the form of acoustic information (e.g. spoken voice, or music, to name but a few non-limiting examples). The mobile device comprises communication means, e.g. for communication via the wireless communication network, in particular a cellular communication network according to LTE communication standard or NR communication technology. The mobile device may for instance be a smartphone, tablet, wearable, or IoT (Internet of Things) device, to name but a few non-limiting examples.

The plural of the term 'data transmissions' as used herein refers to one or more data transmissions that one or more respective mobile devices should receive, wherein a respective data transmission of the data transmissions may for instance be for a corresponding user of one or more users, wherein each of the one or more users may for instance use a respective mobile device of the one or more mobile devices. It will be understood that the method according to the first and/or second exemplary aspect of the present invention may also be performed and/or controlled for one data transmission for a single user only.

After a data transmission of the (plurality of) data transmissions is received, the respective data transmission may for instance be buffered. The received data transmissions may for instance be stored in a buffer comprised by or being connectable to the centralized unit. Such a buffer may for instance be a memory or storage that enables to store the received data transmissions until they are processed, e.g. encoded and output in case of the method according to the first exemplary aspect of the present invention.

The physical channel information is obtained (e.g. received), e.g. from the distributed unit or an entity of the wireless communication network that is different from the distributed unit and that relays the physical channel information to the centralized unit.

The physical channel information may for instance comprise or represent QoS (Quality of Service) metrics, and/or channel state information that are associated with the at least one physical (e.g. radio) channel (also referred to as radio link). The at least one physical channel within the meaning of the present invention is a physical communication channel or a radio link of the wireless communication network that can be used for transmitting the data transmissions to one or more mobile devices that are present within the wireless communication network.

The data transmissions are scheduled, in particular (directly) upon reception of the data transmissions. The scheduling may for instance be performed and/or controlled by means that are a part of the centralized unit or that are comprised by the centralized unit. The scheduling may for instance be performed and/or controlled by a user scheduler. The user scheduler may for instance be comprised by or being a part of the centralized unit.

Each data transmission that should be transmitted to a mobile device (e.g. via downlink transmission in the perspective of the respective mobile device) of the data transmissions can be scheduled based at least partially on the physical channel information, wherein (e.g. as a result of the scheduling) a tentative scheduling grant is determined for at least a part of the data transmissions to be encoded tentatively.

The encoding may for instance be performed based at least partially on available resource(s) and storage that can be utilized by the centralized unit. For instance, such available resource(s) and storage may provide processing power that can be allocated e.g. to perform the scheduling and/or the encoding of the received data transmissions.

The encoding is performed and/or controlled in a tentative fashion according to the present invention. Thus, the encoding of the received data transmissions is performed and/or controlled, e.g. directly after the receiving of the data transmissions. Thus, after a respective data transmission of the (e.g. plurality of) data transmissions is received completely, the encoding may for instance be performed and/or controlled directly afterwards, or in particular, directly after the corresponding data transmissions are scheduled.

At least a part (thus meaning not necessarily all) of the data transmissions are encoded. In particular, the data transmissions that are scheduled, wherein as a result of the scheduling, a tentative scheduling grant is determined, are encoded tentatively. The encoding is performed and/or controlled in a tentative fashion upon reception of the data transmissions, wherein the data transmissions may for instance be encoded based on the tentative scheduling grant.

Within the meaning of the present invention, in particular the encoding may for instance be performed and/or controlled based on the tentative scheduling grant. For instance, the encoding may for instance be performed and/or controlled based on a tentative scheduling grant without information which e.g. time- and/or frequency-resources of the at least one physical channel will be available or allocated to the respective data transmission. Further, the encoding is performed and/or controlled without performing e.g. an obtaining of a scheduling decision of at least one distributed unit of the at least one cell prior to the encoding.

The encoded data transmissions are then output, e.g. to a distributed unit of the at least one cell. The encoded data transmissions may for instance be output to the at least one second apparatus performing and/or controlling the method according to the second exemplary aspect of the present invention. In this way, a functional split between the centralized unit performing and/or controlling the method according to the first exemplary aspect of the present invention and the distributed unit performing and/or controlling the method according to the second exemplary aspect of the present invention can be achieved. It will be understood that the encoded data transmissions can also be output from the first apparatus performing and/or controlling the method according to the first exemplary aspect of the present invention to the second apparatus performing and/or controlling the method according to the second exemplary aspect of the present invention.

In this way, it is possible to process and/or multiplex low-latency traffic such as URLLC (Ultra Reliable Low Latency Communication) and/with less latency-sensitive traffic such as eMBB (enhanced Mobile Broadband) in the same (e.g. radio) cell of the wireless communication network. URLLC in particular requires short TTI(s) (e.g. TTI-length of ⅐ ms or 1/14 ms or even less, to name but a few non-limiting examples), and short processing times, while eMBB may for instance require longer TTI(s) (e.g. TTI-length of 1 ms as in LTE or even longer/multiples thereof, to name but a few non-limiting examples). According to the 3GPP standard, longest TTI-length may for instance be limited to 1 ms. Further, short TTI-length may for instance be defined as follows (e.g. according to NR 3GPP standard): $\mu=0$ numerology may for instance be equivalent to 1 ms TTI-length, $\mu=1$ numerology may for instance be equivalent to 500 µs TTI-length, $\mu=2$ numerology may for instance equivalent to 250 µs TTI-length, to name but a few non-limiting examples in particular for short TTIs. Thus, $\mu=n+1$ may for instance divide the TTI-length of $\mu=n$ by 2. Further, the scheduling (of a method according to the second exemplary aspect) may for instance comprise the assigning of so-called mini-slot, e.g. given by 2, 4, or 7 OFDM symbols to be assigned as a time-frequency resource that can be used for the transmission.

According to the present invention, it is enabled to process low-latency traffic in the distributed unit. Further, the solution according to the present invention enables in particular to offload the processing of latency-insensitive traffic to the centralized unit.

According to an exemplary embodiment of the first exemplary aspect of the present invention, the data transmissions are encoded tentatively based at least partially on a channel coding.

Such a channel coding may for instance be a forward error correction (FEC) so that e.g. error(s) which may occur during the transmission of the data transmission(s) on the at least one physical layer (e.g. the radio link) are detectable and optionally correctable at the mobile device that receives the data transmission(s). In this way, error correction is enabled.

According to an exemplary embodiment of the first exemplary aspect of the present invention, the method further comprises:
buffering the received data transmissions, wherein a size of a payload and a code rate are determined based at least partially on a filling state indicative of the amount of buffered data transmissions, wherein the tentative scheduling grant is determined further based on the size of the payload and the code rate, and wherein the data transmissions are encoded further based on the determined size of the payload and the code rate.

The encoding of the data transmissions may for instance be performed and/or controlled in a tentative fashion upon reception of the data transmissions, wherein a size of a payload and a code rate are determined based at least partially on a filling state indicative of the amount of buffered data transmissions, wherein the tentative scheduling grant is determined further based on the size of the payload and the code rate. Then, the data transmissions may for instance be encoded based at least partially on the determined size of the payload and the code rate.

SDAP (Service Data Adaptation Protocol), PDCP (Packet Data Convergence Protocol), RLC (Radio Link Control), and/or MAC (Media Access Control) processing, to name but a few non-limiting examples, may for instance be carried out in the centralized unit. Therefore, a buffer that may for instance be used for the buffering and that may for instance be comprised by the centralized unit of the at least one cell, is for instance represented by a buffer of the PDCP processing (e.g. a PDCP output buffer) and/or a buffer of the RLC processing (e.g. a RLC input buffer). The tentative encoding may for instance be performed and/or controlled based at least partially on instructions (e.g. as a result) of the scheduling (e.g. the user scheduler comprised by or being a part of the centralized unit). The radio resources (e.g. TTI, TTI duration respectively length and frequency domain resources of the at least one physical channel such as physical resource blocks or physical channel or carrier, which can be used for transmitting of the data transmissions to the one or more mobile devices) may for instance be not yet known respectively unknown when performing and/or controlling the method according to the first exemplary aspect of the present invention. The scheduling that is performed and/or controlled on part of the centralized unit utilizes the (obtained) physical channel information for its tentative encoding.

According to an exemplary embodiment of all aspects of the present invention, the encoding is performed and/or controlled further based on one or more encoding parameters of the following parameters i) to iii):
 i) traffic load of the at least one cell; and
 ii) traffic priorities associated with the data transmissions;
 iii) maximum data rate or maximum number of physical channel resources associated with the data transmissions to the respective mobile device.

The encoding parameters i), ii) and/or iii) may for instance be considered for the determining of the size of the payload and the code rate that are used for the encoding.

For instance, in case the traffic load of the cell is low, a higher code rate and/or a higher size of payload for the encoded data may be used compared to a high traffic load of the at least one cell. Since in case of a high traffic load of the at least one cell, e.g. few resources to be assigned are available, e.g. transport blocks that may be used for transmitting the encoded data transmissions can be multiplexed in the frequency and time domain with lower size of payload for the encoded data. In case of a high traffic load in a neighbor cell of the at least one cell, a lower code rate for the encoded data may be used, e.g. to account for errors. Such errors that can occur during the transmission may for instance be high interference levels between (neighbor) cells, to name but one non-limiting example.

Further, encoding parameter i) of the traffic load of the at least one cell may for instance be the traffic load of the cell comprising the centralized unit and the one or more distributed units. Further, encoding parameter i) of the traffic load of the at least one cell may for instance be the traffic load of the cell comprising the centralized unit and the one or more distributed units and, additionally, the traffic load of one or more neighbor cells of the cell comprising the centralized unit and the one or more distributed units. It will be understood that the traffic load of one or more neighbor cells may for instance be represented by an encoding parameter as well, wherein this encoding parameter may differ from encoding parameter i), since it is without the traffic load of the cell comprising the centralized unit and the one or more distributed units.

Information of traffic load in a neighbor cell may for instance be provided by one of the plurality of distributed units connected to the centralized unit, or alternatively be provided from another centralized unit via a network interface, or be derived from information of traffic load in the at least one cell (e.g. a serving cell of a user). Information of traffic load may for instance be provided according to one or more of the aforementioned cases, since average traffic load in neighboring cells is often correlated. Then, e.g. interference resulting in non-decodable data after the transmission may for instance be more likely compared to a lower traffic load of the cell, which has more accounting for errors so that e.g. a smaller size of payload and/or lower code rate can be used for the encoding.

Data transmissions, e.g. to be transmitted to the one or more mobile devices, may for instance be associated with different traffic priorities. For instance, at least one of the data transmissions may be associated with a high priority, and another data transmission may for instance be associated with a low priority. The data transmission(s) associated with the high priority may for instance be required to be i) transmitted earlier than other data transmissions associated with a low priority and that are received, e.g. to be transmitted to mobile devices, and/or ii) encoded with a more robust encoding. The encoding may for instance be more robust e.g. to errors and/or interferences that may occur during the transmission, in case the data transmissions associated with a high priority are encoded based on a lower size of payload and/or a lower code rate compared to a higher size of payload and/or a higher code rate which may be less prone to errors that may occur during the transmission.

One or more of the parameters i) to iii) may for instance be provided by a distributed unit (e.g. the at least one second apparatus) to the centralized unit. Encoding parameter ii) may for instance be provided by higher layers, e.g. SDAP layer, to the centralized unit.

According to an exemplary embodiment of all aspects of the present invention, the first method further comprises:
obtaining channel quality information comprised by or being a part of the physical channel information, wherein the channel quality information is indicative of one or more parameters representing a current state of the at least one physical channel;
wherein the data transmissions are further scheduled based at least partially on the obtained channel quality information and/or the obtained information concerning traffic load and/or traffic priorities and/or maximum data rate or maximum number of physical channel resources (e.g. one or more of the encoding parameters i) to iii)).

The channel quality information is obtained (e.g. received). The channel quality information is received together with the physical channel information. For instance, the channel quality information comprises a highest possible modulation (scheme) and a code rate, e.g. at which a block error rate of the physical channel does not exceed a certain limit.

The channel quality information, or the physical channel information comprising the channel quality information may for instance be obtained (e.g. received) via reporting of such channel quality information, or such physical channel information comprising the channel quality information, from one or more mobile devices, e.g. mobile devices which are registered at the least one cell of the wireless communication network. A current state of at least one physical channel which may for instance be used for transmitting the data transmissions to the mobile devices, may for instance be gathered by one or more mobile devices registered at the least one cell. Then, the mobile devices may for instance determine a corresponding channel quality information, or the physical channel information comprising the channel quality information, based at least partially on the gathered current state of at least one physical channel. Further, the mobile device may for instance send the corresponding channel quality information, or the physical channel information comprising the channel quality information, to the centralized unit. Additionally or alternatively, the channel quality information, or the physical channel information comprising the channel quality information, may for instance be obtained by requesting the channel quality information, or the physical channel information comprising the channel quality information, e.g. from one or more mobile devices of the at least one cell. Based on the request, the mobile devices may for instance send corresponding one or more channel quality information, or the physical channel information comprising the channel quality information, to the centralized unit. In this way, the channel quality information, or the physical channel information comprising the channel quality information, is obtained by the centralized unit from one or more mobile devices, e.g. by relaying the channel quality information, or the physical channel information comprising the channel quality information over the distributed unit.

According to an exemplary embodiment of all aspects of the present invention, the encoding is performed and/or controlled further based on a back-off margin indicative of a reduced code rate and/or reduced size of the payload (that is carried by the encoded data transmissions).

The back-off margin may for instance be utilized for taking into account a possible degradation of a channel quality and/or increase of traffic load of the at least one channel, wherein the degradation and/or the increase may be caused by a delay due to the tentative encoding and a delay on midhaul interface between the centralized unit and the distributed unit that is performed and/or controlled.

The back-off margin in case it is considered may for instance reduce somewhat the spectral efficiency for the one or more users respectively the corresponding mobile devices of the one or more users of the base station (e.g. a gNB). However, the impact is likely small since e.g. physical channel information reporting, as described above, may for instance be infrequent (e.g. may for instance be performed and/or controlled in pre-defined time intervals (e.g. every 20 ms, to name but one non-limiting example)).

According to an exemplary embodiment of all aspects of the present invention, the back-off margin is determined based at least partially on the physical channel information and/or traffic load of the at least one cell.

The physical channel information and/or traffic load may for instance be represented (or comprised) by the (obtained) channel quality information.

According to an exemplary embodiment of all aspects of the present invention, the buffering comprises storing the received data transmissions in a buffer, wherein the filling state resulting from the buffering is represented, for example, by the number of data transmission bits stored in buffer for a user or for a Data Radio Bearer (DRB), or by the amount of data transmissions that are stored in the buffer in relation to a total amount of data that can be stored in the buffer.

The buffer may for instance be taken into account when the filling state is considered for determining the size of the payload and/or the coding rate for the encoding of the data transmissions.

According to an exemplary embodiment of all aspects of the present invention, the tentative encoding is enabled by a forward error correction encoding.

The encoding may for instance be performed and/or controlled based at least partially on such FEC (Forward Error Correction) encoding. For instance, during the encoding, redundancy bits may for instance be generated based on the bits of the data transmissions to be encoded. These redundancy bits may for instance allow receivers (e.g. mobile devices) of the encoded data transmissions to detect errors that may have occurred during the transmission. Additionally, the redundancy bits may for instance allow the receivers (e.g. mobile devices) of the data transmissions to correct the detected errors. In this way, often times, retransmission of erroneous data transmissions is not required. Examples for codes that can be used by such a FEC encoding are Low Density Parity Check (LDPC) codes, Turbo codes, or Polar codes, to name but a few non-limiting examples.

According to an exemplary embodiment of all aspects of the present invention, each of the encoded data transmissions is outputted together with a respective control information indicative of a user identifier enabling the respective data transmissions to be transmitted to a corresponding mobile device.

According to an exemplary embodiment of the first exemplary aspect of the present invention, the respective control information is further indicative of received data transmissions that are to be transferred to the one or more mobile devices.

It will be understood that for the transferring of the data transmissions to the one or more mobile device, the one or more mobile devices are located within the coverage area of the at least one cell.

According to an exemplary embodiment of all aspects of the present invention, at least a part of the data transmissions is enabled to be carried on short Transmission-Time-Intervals and at least a further part of the data transmissions is enabled to be carried on longer Transmission-Time-Intervals compared to the short Transmission-Time-Intervals.

The short Transmission-Time-Interval(s) may for instance be utilized by low latency traffic, e.g. data transmissions that are expected or required at the receiver (the one or more mobile devices) very quickly (e.g. video and/or audio streaming data transmissions, to name but a few non-limiting examples).

The longer Transmission-Time-Interval(s) may for instance be utilized by latency-insensitive traffic (e.g. documents, or the like, to name but one non-limiting example). Compared to the short Transmission-Time-Interval(s), the longer Transmission-Time-Interval(s) may for instance be an equivalent of two short Transmission-Time-Interval(s), e.g. one short Transmission-Time-Interval may for instance be of the length of ½ ms, 1/7 ms, 1/14 ms, or less. One longer Transmission-Time-Interval compared to the short TTI may for instance be of the length of 2/14 ms, 2/7 ms, 1 ms, or longer. Further, TTI-length may for instance be defined as is already described above with respect to the e.g. u-numerology that is equivalent to a respective TTI-length (e.g. µ=0 corresponds to 1 ms TTI-length).

Optionally, the received (encoded) data transmissions of the method according to the second exemplary aspect of the present invention are buffered.

The scheduling of the data transmissions of the method according to the second exemplary aspect of the present invention (e.g. to be transferred to one or more mobile devices) of the method according to the second exemplary aspect of the present invention, may for instance be performed and/or controlled (e.g. directly) upon reception of the (already encoded) data transmissions. Within the meaning of the present invention, performing and/or controlling the scheduling of the data transmission directly upon the reception of the data transmissions may for instance take place without further communication between the distributed unit performing and/or controlling the method according to the second exemplary aspect of the present invention and the centralized unit performing and/or controlling the method according to the first exemplary aspect of the present invention. For instance, that is e.g. transferring the result of the scheduling (also referred to as scheduling decision) back from the distributed unit of the base station to the centralized unit.

The scheduling of the data transmissions of the method according to the second exemplary aspect of the present invention is performed and/or controlled based at least partially on a Transmission Time Interval (TTI)-by-Transmission Time Interval basis. The TTI-by-TTI basis respectively period may for instance be a regular TTI-by-TTI basis. Such a TTI-by-TTI basis may for instance use short Transmission-Time-Interval(s). The TTI-by-TTI basis may for instance be based at least partially on short Transmission-Time-Interval-by-short Transmission Time Interval basis.

Further, (final) scheduling is performed and/or controlled by the distributed unit. Such a scheduling may for instance comprise e.g. an assignment of time-frequency resources. The scheduling of the method according to the second exemplary aspect of the present invention may for instance comprise a selecting of a data bearer (that is used for transmitting the encoded data transmissions to the one or more mobile devices), a selecting of a time (e.g. time slot that is used for transmitting the encoded data transmissions to the one or more mobile devices), to name but a few non-limiting examples. The scheduling, or the scheduling comprising the selecting of the data bearer and/or the selecting of the time may for instance take into account the physical channel information.

Prior to performing and/or controlling the scheduling according to the second exemplary aspect of the present invention, the buffering of the (received) encoded data transmissions takes place.

Further, within the meaning of the present invention, performing and/or controlling the scheduling of the data transmission directly upon the reception of the data transmissions may for instance be understood as at least one data transmission that is received completely, e.g. in case data transmission for more than one (e.g. at least two) users is received (at the distributed unit).

In case a plurality of data transmissions for one or more users is scheduled, it will be understood that the scheduling may for instance be performed and/or controlled (e.g. directly) after the data transmission(s) for this user is received completely.

The scheduling of the data transmissions may for instance be determined in every short TTI, based on the TTI-by-TTI basis. The TTI-by-TTI basis may for instance comprise a selection of the users to be scheduled. For instance, the users to be scheduled are selected for the upcoming TTI, e.g. together with radio (e.g. frequency domain) resource allocation, and optionally with selecting a modulation coding scheme, depending on a selected PHY split option.

Radio resource allocation may for instance comprise assigning a number of physical resource blocks to the respective data transmissions, wherein one or more transport blocks configured to comprise a number of bits matching with the assigned number of physical resource blocks are generated, wherein the one or more transport blocks are generated based at least partially on the respective data transmissions. Those one or more transport blocks may for instance be transmitted over a physical channel to the respective mobile device.

Optionally, the centralized unit may for instance perform and/or control a first per-user MAC control plane processing. Such a MAC processing may for instance determine a preferred frequency-domain resource allocation and/or TTI duration, to name but a few non-limiting examples, for the corresponding user.

Further, the determining of the MAC processing may for instance be based at least partially on a buffer filling state, wherein the buffer of the base station may for instance comprise data transmissions of one or more users that are registered to the base station and that have requested data transmissions to be performed (e.g. sent to them) by the base station.

Information of preferred time- and/or frequency-domain resources, TTI, TTI duration respectively length, or a combination thereof may for instance be signaled (e.g. transmitted) to the at least one distributed unit for assisting the final scheduling decision taken there. Such information may for instance be referred to as information to assist the final scheduling, wherein the information to assist the final scheduling enables the at least one distributed unit to perform and/or control the (final) scheduling further based on the information (respectively pieces of information in case more than one piece of information to assist the final scheduling is signaled to the at least one distributed unit).

The encoded tentatively data transmissions (e.g. generated into corresponding data packets) may for instance be scheduled with or without additional delay after becoming available in the distributed unit. For instance, the data transmissions can be scheduled into the very next TTI available or in a later TTI, e.g. depending on traffic load and/or traffic priorities of the at least one cell.

The data transmissions of the scheduled data transmissions (e.g. generated into or forming corresponding data packets to be transmitted) are then carried out, e.g. by the at least one physical channel of a radio frequency, which may for instance enable data transmission on pre-determined or determined according to pre-defined rules (time-domain and/or frequency-domain) slots (e.g. referred to as TTI(s) in time-domain, and PRB(s) in frequency domain), wherein each slot of those slots may be of a pre-determined duration and/or frequency, e.g. with respect to the at least one physical channel. For instance, for mapping in the frequency-domain, a selected TTI of the time-domain is e.g. mapped to PRB(s) of the frequency-domain. The transmitting of the data transmissions may for instance then be carried out by a data plane processing. Such a data plane processing may for instance be a part of the centralized unit. Since such a data plane processing may for instance follow one or more instructions respectively functions of the base station that are performed and/or controlled by the centralized unit of the base station, and one or more instructions respectively functions of the base station that are performed and/or controlled by the distributed unit, the data plane processing is split between centralized unit and distributed unit.

For instance, the wireless communication network may enable a CDMA (Code Division Multiple Access) network. Thus, the slots respectively TTIs may be subsequent to each other in the time domain. Additionally or alternatively, PRB(s) may for instance be multiplexed in the frequency domain as well, e.g. as provided by a wireless communication network enabling OFDM (Orthogonal Frequency Division Multiplexing) transmission schemes. In order to transmit the scheduled data transmissions, so called PHYcell processing may for instance be performed and/or controlled for at least one cell of the communication network. Such PHYcell processing may for instance be a time and/or frequency domain allocation according to the performed scheduling, as well as the multiplexing of all the physical signals and channels that need be transmitted in the cell within a TTI, and the generation of a time-domain transmission signal, e.g. by performing an IFFT in an OFDM transmission scheme. Further, the scheduled data transmissions may for instance be modulated according to a control information. Such a control information may for instance be determined as a part of the scheduling. Further, the determined control information may for instance be output, e.g. to a (e.g. downlink) control channel so that the scheduled data transmissions can be transmitted over the corresponding physical channel by a controlling of the (e.g. downlink) control channel.

In this way, multiple conditions that are advantageous e.g. for a CRAN architecture are achieved by the method of all aspects of the present invention:

Although a distributed unit (e.g. the distributed unit) is responsible for (very) low latency processing, while a centralized unit (e.g. the centralized unit) of the at least one cell can process data transmissions with more relaxed latency requirements, very low latency is achieved. Further, latency demand on midhaul interface is limited due to the scheduling and tentative encoding of the centralized unit. Thus, the scheduling and the tentative encoding of the centralized unit enable to reduce the latency demand. Further, bandwidth demand on the midhaul interface is limited, e.g. due to avoiding the use of I/Q-based interfaces like CPRI. Further, due to the shift of the necessary processing from the centralized unit of the at least one cell to the distributed unit, the available processing of the decentralized unit is exploited as much as possible, while the further processing power of the centralized unit of the at least one cell is used flexibly, e.g. on corresponding demand (e.g. when processing power of the distributed unit is fully exploited and additional processing power is required), and taking benefit of statistical multiplexing gains of a plurality of (neighboring) cells of the network. Further, a wide range of midhaul latencies can be supported. It will be understood that the enhancement are further present in case one or more distributed unit are present.

According to an exemplary embodiment of all aspects of the present invention, additionally ARQ (Automatic Repeat Request) error control may be utilized for the data transmissions, e.g. between the distributed unit and mobile devices residing within a coverage area deployed by the at least one cell, wherein the scheduled data transmissions are transmitted to these mobile devices. A combination of FEC and ARQ may for instance be used for the data transmissions, e.g. between the distributed unit and mobile devices residing within a coverage area deployed by the at least one cell. An example of such a combination to FEC and ARQ is HARQ (Hybrid automatic repeat request). HARQ may for instance enable a compensation for increased scheduling delay, which might occur according to the present invention.

According to an exemplary embodiment of the second exemplary aspect of the present invention, the scheduling is enabled by a frequency-domain scheduling.

After the scheduling, the data transmissions may for instance be transmitted utilizing the at least one physical channel (e.g. of a certain radio frequency), which may for instance enable data transmission on pre-determined or determined according to pre-defined rules (frequency-domain) slots, wherein each slot of those slots may be of frequency, often called physical resource blocks. Thus, it is possible to transmit more than one data packets carrying the data transmissions simultaneously at different carrier frequencies or on different physical resource blocks at the same carrier frequency.

For instance, the distributed unit may comprise means for performing and/or controlling frequency-domain scheduling, e.g. a frequency-domain scheduler.

According to an exemplary embodiment of second exemplary aspect of the present invention, the scheduling further comprises:
  associating each of received data transmissions with a respective radio resource allocation information indicative of a physical resource that can be utilized for the transmission of the scheduled data transmissions.

For instance, for each TTI of the available TTIs that may be used for transmission of the data transmissions, the users to be scheduled may for instance be selected. Further, e.g. actual frequency domain resource allocation and modulation coding scheme may for instance be associated with the users to be scheduled, for each TTI of the TTIs that may be used for transmission of the data transmissions.

According to an exemplary embodiment of all aspects of the present invention, the physical resource is at least one physical channel that can be utilized to transmit data packets in a time- and/or frequency domain. The data packets may for instance carry at least a part of the data transmissions.

According to an exemplary embodiment of all aspects of the present invention, the data transmissions are transmitted based on the respective radio resource allocation information derived or provided by the distributed unit that enables at least a part of the data transmissions to be mapped by a data processing plane (e.g. SDAP, PDCP, RLC, MAC, and/or PHY processing or processing parts thereof). Parts of the data plane processing are performed and/or controlled in the centralized unit, wherein in particular resource allocation is performed and/or controlled in the distributed unit.

For instance, after the tentative encoding with the channel coding, a (full) transport block is generated. This transport block is represented by a data packet carrying at least a part of the data transmissions. In example embodiments according to all aspects of the present invention, the transport block may for instance be transferred (e.g. sent) from the centralized unit to the distributed unit, e.g. together with respective control information that may be needed for transmitting the transport block (e.g. downlink control information) to the respective mobile device of the one or more mobile devices. Information concerning which Physical Resource Block(s) to use for the data transmissions may for instance not be sent from the centralized unit to the distributed unit, since the Physical Resource Block(s) may for instance be decided by the scheduling that is performed and/or controlled by the distributed unit. In this case, only information concerning preferred Physical Resource Block(s) may respectively be sent to the distributed unit. For instance, complete downlink control information for the PDCCH (Physical Downlink Control Channel) as the at least one physical channel may be built by the distributed unit. Further, in some example embodiments according to all aspects of the present invention, tentative link adaption may for instance be carried out in the centralized unit, and final link adaption may then be carried out in the centralized unit as well, or alternatively final link adaption may be carried out in the distributed unit.

According to an exemplary embodiment of all aspects of the present invention, the scheduling is performed based at least partially on one or more scheduling parameters, wherein the one or more scheduling parameters represent or comprise one or more of the following parameters i) to iii):
  i) a modulation scheme;
  ii) a time duration of the TTI (e.g. for the slot to be assigned);
  iii) a selection of one or more Physical Resource Blocks.

Then, the scheduling (as performed by distributed unit according to the method of the second exemplary aspect of the present invention) may for instance be finalized based at least partially on the one or more scheduling parameters i) to iii).

For instance, each user is allocated a number of PRBs (Physical Resource Blocks) in a time-frequency grid that can be used for the data transmissions, wherein each space of such a time-frequency grid may for instance be used for carrying e.g. at least a part of a scheduled data transmission of the scheduled data transmissions. The more resource blocks a user gets, and the higher the modulation used in the resource elements is, the higher is the bit-rate.

For instance, such a PRB may be a unit of allocation, e.g. represented by a resource allocation information. The scheduling may for instance maximize the use of the physical resources available.

According to an exemplary embodiment of all aspects of the present invention, the scheduling of the data transmissions further comprises (e.g. carried out prior to the scheduling):
  generating a plurality (e.g. at least two) of code block groups forming a single transport block based at least partially on the received data transmissions, wherein each of the generated plurality of code block groups is scheduled individually, e.g. according to the one or more scheduling parameters.

According to an exemplary embodiment, each CBG (Code Block Group) is self-decodable at the receiver (e.g. the respective mobile device) so that the receiver is enabled to decode each of the received CBGs. After receiving all of the CBG, which may for instance be received on different, e.g. separated, TTIs, all of the received CBGs can be put together in order to obtain the payload of the data transmissions. Thus, encoded data transmissions may for instance be separated into a plurality of CBGs, e.g. for the transmission to a respective mobile device.

According to an exemplary embodiment of all aspects of the present invention, the scheduling further comprises:
  determining one or more rate matching parameters indicative of a number of bits that can be transmitted based at least partially on the radio resource allocation information allocation, wherein the data transmissions are scheduled corresponding to this number of bits.

Rate matching may for instance be used while assembling a data packet (e.g. a MAC PDU (Protocol Data Unit)) for the transmission of the data transmissions, e.g. to the respective mobile devices. For instance, one MAC PDU may be carried by a single transport block per mobile device, e.g. to which mobile device the data transmission is intended to be transmitted.

The one or more rate matching parameters may for instance be determined by a selection of the one or more rate matching parameters and/or modulation scheme. The determining of the one or more rate matching parameters may be performed and/or controlled by the centralized unit, or alternatively by the distributed unit. This may for instance depend upon the splitting (of tasks) that is chosen between the centralized unit and the distributed unit of the base station.

According to an exemplary embodiment of all aspects of the present invention, the second method further comprises:
gathering (e.g. measuring) resource information indicative of available resources that can be utilized for the transmitting of data transmissions to one or more mobile device; and
outputting the resource information.

The gathering of the resource information may for instance be performed and/or controlled steadily, or in pre-determined or determined according to pre-defined rules time intervals, for example in every TTI or radio frame. Then, the gathered resource information may for instance be sent to the centralized unit, e.g. the first apparatus performing and/or controlling the method according to the first exemplary aspect of the present invention. The resource information may for instance be used by the centralized unit (e.g. the first apparatus) for determining the size of the payload and/or the code rate for the encoding. By outputting the gathered resource information e.g. to the centralized unit (e.g. the first apparatus), reporting of the resource information e.g. from the distributed unit to the centralized unit of the at least one cell is enabled.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
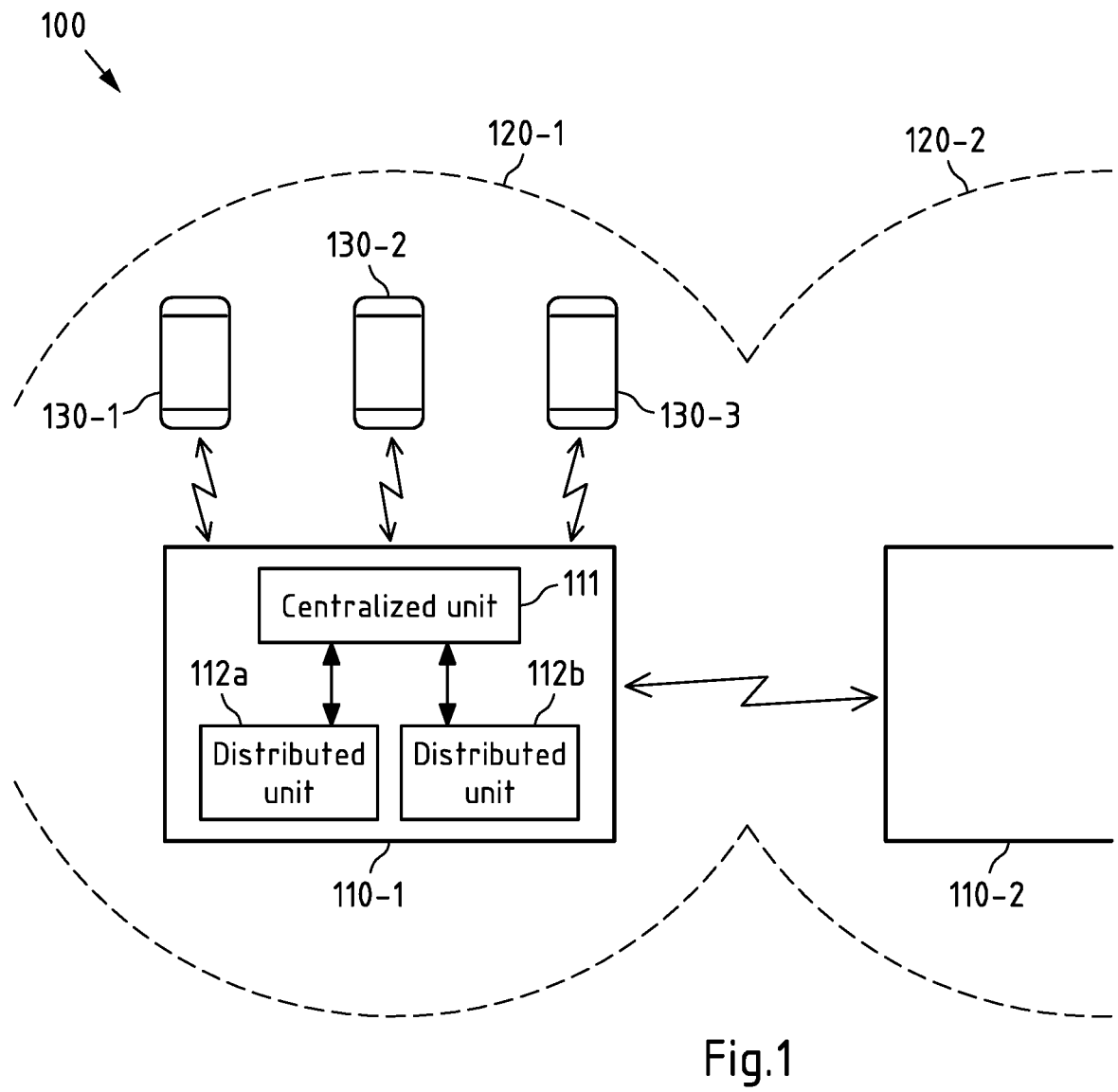
FIG. 1 a schematic block diagram of a system according to an exemplary aspect of the present invention.

FIG. 1 is a schematic high-level block diagram of a system 100 according to an exemplary aspect of the present invention. System 100 comprises a plurality of cells that are part of a wireless communication network, of which two cells 120-1 and 120-2 are shown in FIG. 1. Each of the cells comprises a base station, e.g. a gNB. For instance, cell 120-1 comprises gNB 110-1, and cell 120-2 comprises gNB 110-2. Each of the gNBs, can comprise a centralized unit and one or more distributed unit. For instance, as is shown in FIG. 1, gNB 110-1 of cell 120-1 comprises centralized unit 111 and distributed units, wherein in FIG. 1 two distributed units 112a and 112b are shown. Together, entities 120-1, 110-1 and at least one of the mobile devices 130-1 to 130-3 form a CRAN architecture of a wireless communication network.

The centralized unit 111 and at least one of the distributed units 112a or 112b may for instance be part of a server, which may alternatively be embodied as a server cloud (e.g. a plurality of servers connected, e.g. via the wireless communication network (or e.g. the Internet) and providing services at least partially jointly). Communication between the entities, in particular the centralized unit 111 and the distributed units 112a and 112b can take place, as is indicated by the arrows shown in FIG. 1 between those entities. Such a communication may for instance be a midhaul communication, e.g. over a fiber cable, to name but one non-limiting example.

According to embodiments of the present invention, centralized unit 111 receives data transmissions to be transmitted to at least one of the mobile devices 130-1 to 130-3 that are registered or logged-in to the cell 120-1. Upon reception of the data transmissions, centralized unit 111 buffers the received data transmissions. Then, centralized unit 111 performs and/or controls a tentative encoding of the data transmissions. Then, the encoded data transmissions are output from the centralized unit 111 to at least one of the distributed units 112a and 112b to be scheduled. For instance, the encoded data transmissions are output from the centralized unit 111 to the distributed unit 112a.

The distributed unit 112a receives the (encoded) data transmissions. Directly upon reception of the (encoded) data transmissions, the distributed unit 112a performs and/or controls a scheduling of the data transmissions without further communication between the distributed unit 112a and the centralized unit 111 being required. After the data transmissions are scheduled by the distributed unit 112a, the data transmissions are transmitted from the distributed unit 112a to the corresponding mobile terminals 130-1 to 130-3 based on the result of the scheduling. Communication between the distributed units 112a and 112b, the centralized unit 111, and/or the gNB 110-1 and the mobile devices 130-1 to 130-3 may for instance take place at least partially in a wireless fashion, e.g. based on cellular radio communication (radio frequency), e.g. according to LTE or NR (e.g. 5G (Fifth Generation)) communication standards and/or technologies.

Figure 2:
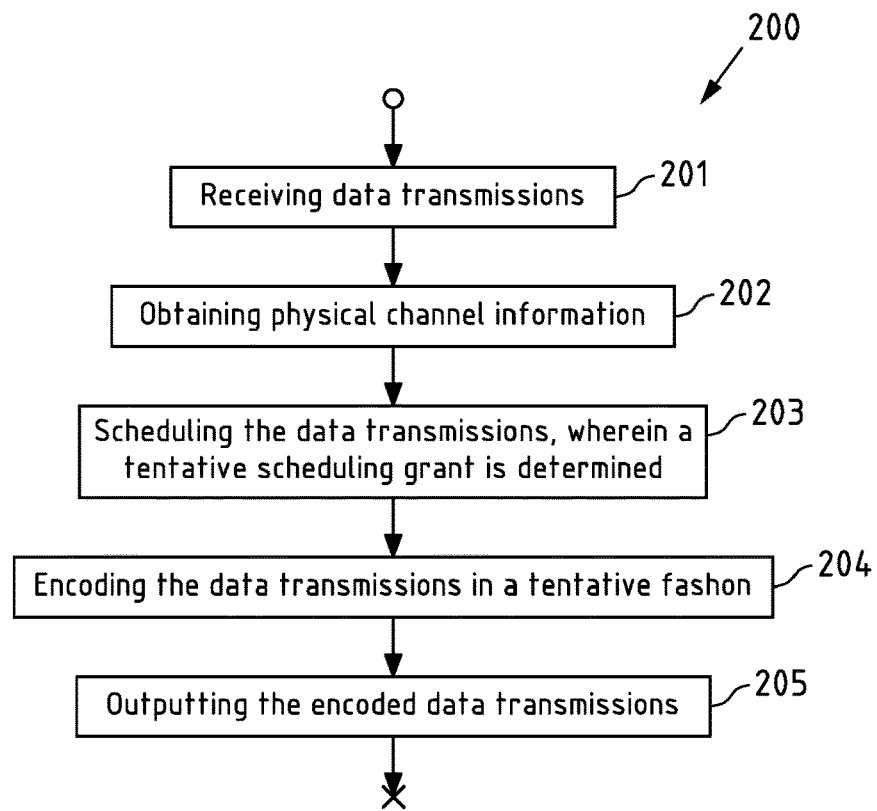
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart may for instance be performed and/or controlled by centralized unit 111 of FIG. 1.

In a first step 201, data transmissions to be transmitted to mobile devices (e.g. mobile devices 130-1 to 130-3 of FIG. 1) are received, e.g. from a server that is connected via a wireless communication network to a gNB, e.g. gNB 110-1 of FIG. 1.

In a second step 202, the physical channel information are obtained (e.g. received). The physical channel information may for instance be received from the distributed unit 112a or 112b of FIG. 1.

In a third step 203, the data transmissions are scheduled, wherein a tentative scheduling grant is determined. This tentative scheduling is performed and/or controlled without an assignment of time-frequency resources to the data transmissions. The assignment of the time-frequency resources is performed by the scheduling that is performed and/or controlled by the distributed unit (see step 303 of FIG. 3). The scheduling may for instance be performed and/or controlled based at least partially on the obtained physical channel information of step 202. Further, the scheduling may for instance be performed and/or controlled based at least partially on QoS metrics (that are e.g. calculated by the centralized unit 111 of FIG. 1 prior to the scheduling). Further, the scheduling may for instance be performed and/or controlled based at least partially on channel state information that may for instance be comprised by or be a part of the obtained physical channel information. Taking these aforementioned features into account, a scheduling decision may for instance be the result of the scheduling that is performed and/or controlled by the centralized unit 111 of FIG. 1.

Optionally, the received data transmission are buffered (e.g. stored), e.g. in a memory (e.g. data memory 540 of FIG. 5) that is comprised by or being connectable to the centralized unit 111 of FIG. 1. For instance, such a memory may for instance be comprised by apparatus 500 that is configured to perform and/or control the method according to the first exemplary aspect of the present invention.

In a fourth step 204, at least a part of the data transmissions are encoded, e.g. by a processor (e.g. processor 510 of FIG. 5) that is comprised by or being connectable to the centralized unit 111 of FIG. 1. For instance, such a processor may for instance be comprised by apparatus 500 that is configured to perform and/or control the method according to the first exemplary aspect of the present invention.

In a fifth step 205, the encoded data transmissions are output, e.g. e.g. from the centralized unit 111 of FIG. 1 to at least one of the distributed units 112a and/or 112b of FIG. 1.

Figure 3:
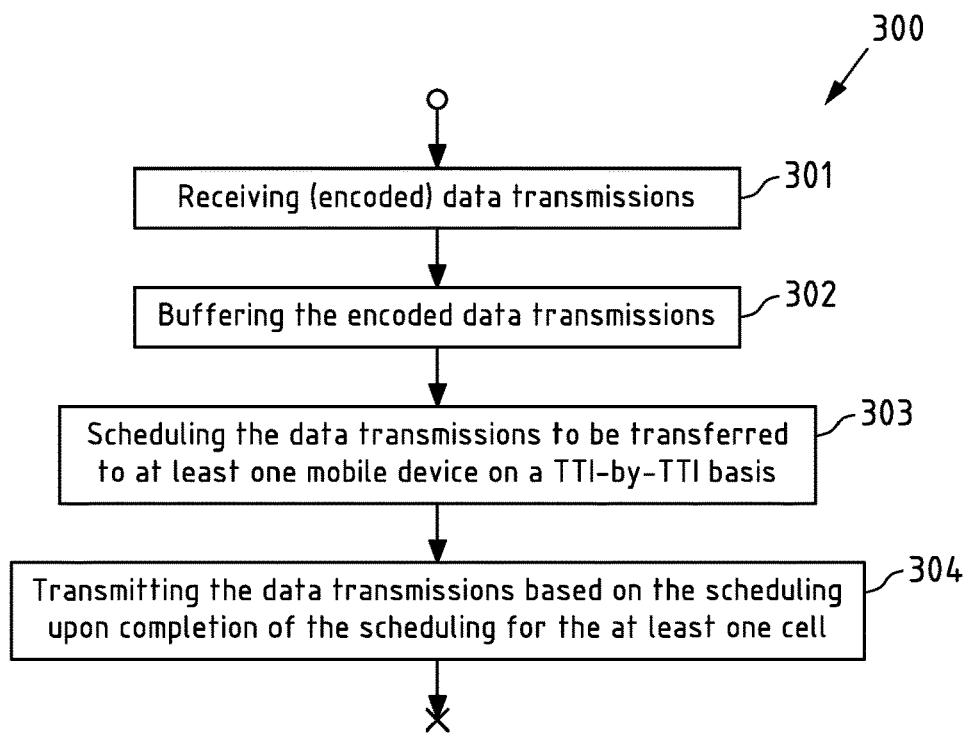
FIG. 3 a flowchart showing an example embodiment of a method according to the second exemplary aspect of the present invention.

FIG. 3 is a flowchart 300 showing an example embodiment of a method according to the second exemplary aspect of the present invention. This flowchart may for instance be performed and/or controlled by at least one of the distributed units 112a and/or 112b of FIG. 1.

This flowchart 300 may for instance be performed and/or controlled together (e.g. directly after the completion of flowchart 200 of FIG. 2 performed and/or controlled e.g. by the centralized unit 111 of FIG. 1).

In a first step 301, (encoded by the centralized unit 111) data transmissions to be transmitted to at least one of a plurality of mobile devices (e.g. mobile devices 130-1 to 130-3 of FIG. 1) are received, e.g. from the centralized unit 111 of FIG. 1.

In a second step 302, the encoded data transmission are buffered (e.g. stored), e.g. in a memory (e.g. data memory 640 of FIG. 6) that is comprised by or being connectable to the distributed unit 112a or 112b of FIG. 1. For instance, such a memory may for instance be comprised by apparatus 600 that is configured to perform and/or control the method according to the first exemplary aspect of the present invention.

In a third step 303, the data transmissions to be transferred to at least one of a plurality of mobile devices (e.g. mobile devices 130-1 to 130-3) are scheduled, e.g. by a processor (e.g. processor 610 of FIG. 6) that is comprised by or being connectable to at least one of the distributed units 112a and/or 112b of FIG. 1. For instance, such a processor may for instance be comprised by apparatus 600 that is configured to perform and/or control the method according to the first exemplary aspect of the present invention.

In a fourth step 304, the scheduled data transmissions are transmitted, e.g. from the at least one of the distributed units 112a and/or 112b of FIG. 1 to at least one of the mobile devices 130-1 to 130-3.

Figure 4A:
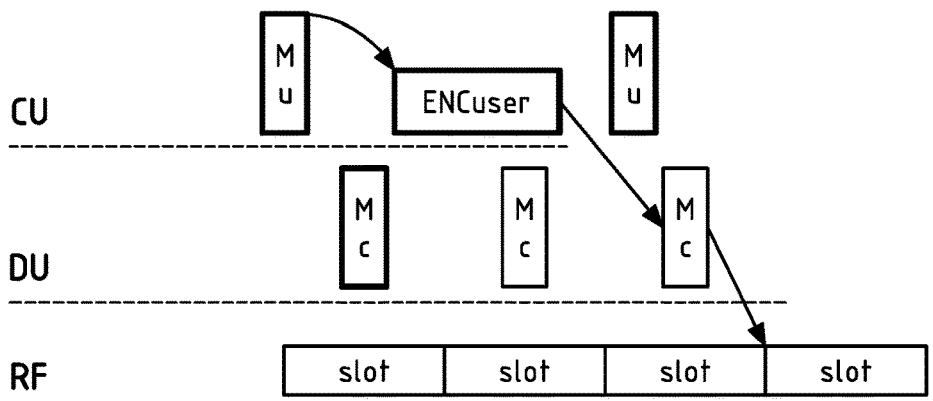
FIGS. 4a-4c respective schematic process flows, each showing an example of a system according to an exemplary aspect of the present invention.
Figure 4B:
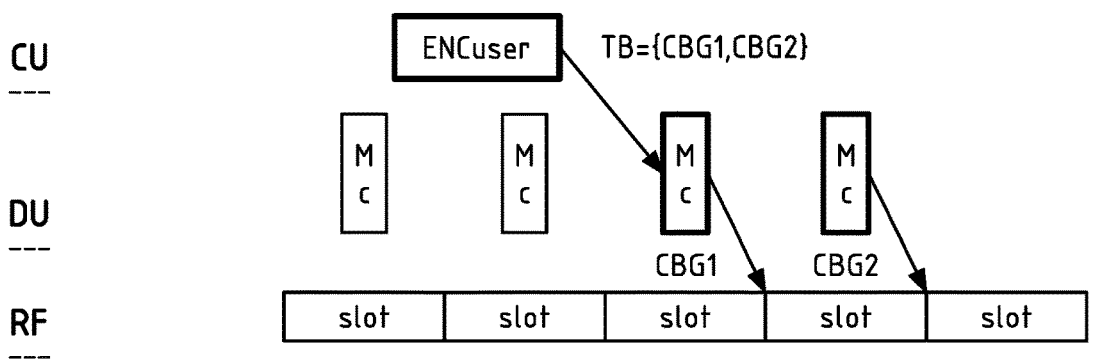
Figure 4C:
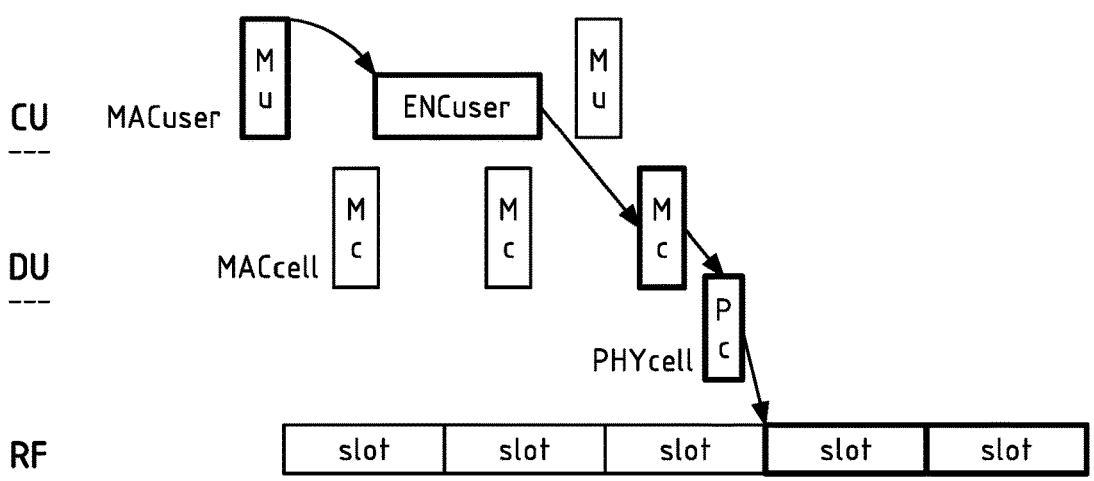

FIGS. 4a-4c show respective schematic process flows, wherein each process flow of the FIGS. 4a-4c illustrate an example of a system according to an exemplary aspect of the present invention. The following embodiments, as show in the FIGS. 4a-4c, shall also be considered to be disclosed:

A CRAN architecture according to all exemplary aspects of the present invention with process flow as e.g. illustrated in FIG. 4a, wherein:

Centralized unit (CU in FIGS. 4a-4c; e.g. centralized unit 111 of FIG. 1) buffers arriving data and performs a "tentative" data encoding (i.e. PHY layer channel coding for error correction), where the payload size and code rate for the encoding is selected according to the buffer filling state, the channel quality (typically obtained via reporting of channel quality information (CQI) from the mobile device (e.g. at least one of the mobile devices 130-1 to 130-3)), available resources for processing and storage, and for example information concerning the resource utilization in the cell (e.g. cell 120-1 of FIG. 1). The latter is obtained from the scheduler in distributed unit (DU in FIGS. 4a-4c; e.g. distributed unit 112a or 112b of FIG. 1).

SDAP, PDCP, RLC, and/or MAC processing, to name but a few non-limiting examples, may for instance be carried out in CU. Therefore, this buffer may be a PDCP output buffer or RLC input buffer. Tentative encoding is instructed by the scheduler in the CU (also referred to as user scheduler in the CU). However, the radio resources used for transmission of the PHY transport block are not yet known (therefore it is called "tentative"; may be called also "radio resource-unaware encoding"). The User Scheduler (responsible for a set of Users) calculates QoS metrics and takes into account CSIs for its tentative encoding.

CU transfers the encoded data bits for the user to DU as soon as the encoding is completed, together with control information containing the PHY user identifier and possibly further information such as the packet size or the coding scheme/rate.

DU buffers the received tentatively encoded data packets

DU carries out the Frequency Domain assignment of the MAC control plane processing for the entire cell. The remaining part of the MAC control plane processing is carried out in the CU. The users to be scheduled are selected, together with actual frequency domain resource allocation and modulation coding scheme. The scheduling decision of the DU for the cell takes into account the tentatively encoded data packets that are obtained from CU, and DU may for example apply additional rate matching on the tentatively encoded data packets. DU will also put together the downlink control information (DCI) and transmit it on the downlink control channel.

The full transport block after FEC encoding as well as information needed for DCI is sent to DU except the PRBs which is decided by the scheduler of the DU (also referred to as FD (Frequency-Domain) Scheduler of the DU). In this case only preferred PRB are/may be sent to DU, or possibly no information at all concerning which PRBs to use for transmission. The complete DCI for the PDCCH is built in the DU. Tentative link adaptation is carried out in CU, final link adaptation in CU (PHY split Option 1; see FIG. 10a) or DU (PHY split Options 2 and 3; see FIG. 10b and FIG. 10c).

Assignment of time frequency-resources (scheduling of the method according to the second exemplary aspect of the present invention) is carried out in DU.

Selection of rate matching parameters and/or modulation scheme may be either in CU (PHY split Option 1, see FIG. 10a) or in DU (PHY split Options 2 and 3; see FIG. 10b and FIG. 10b), the latter gives more flexibility to changes in radio conditions or available radio resources.

The tentatively encoded data packets may be scheduled with or without additional delay after becoming available in DU, i.e. the next TTI or in a later TTI, depending on traffic load and traffic priorities.

In a NR case, there is a feature, where a transport block can be composed of multiple code block groups (CBGs), with a separate HARQ process for each CBG. In principle, such a feature could enable the cell scheduler in DU to partition the tentatively encoded packet into multiple CBGs and transmit the CBGs in different TTIs. This is e.g. illustrated in FIG. 4b.

However, in NR standard there is a CRC appended to the payload of each code block, and a CRC is inserted for the entire transport block, prior to channel encoding. Therefore, a simple splitting of the encoded transport block into CBGs is not compliant with NR standard.

However, in principle such a feature can be enabled in a future communications standard or standard release by inserting a separate CRC per CBG.

In case of NR, the tentative encoding in the CU will do the split to several CBs (or CBGs) with CRC and transfer them to the DU, for example with an indication of the preferred TTI to be used or a TB indication to make sure that all CBs (or CBGs) are send at the same TTI.

FIG. 4c provides a more detailed process flow for a CRAN architecture with tentative encoding in CU.

The tentative encoding in CU may take into account a back off margin, to account for possible degradation of channel quality or increase of traffic load caused by delay from tentative encoding decision until actual transmission of the packet. This may reduce somewhat the spectral efficiency for the users processed in CU, however the impact is likely small since the CQI reporting is typically rather infrequent, e.g. every 20 ms.

An advantage of this CRAN architecture is that there is no need to transfer cell-scheduling decisions from DU back to CU. This relaxes available processing times and increases the maximum deployment distance between CU and DU.

Further solutions to compensate for increased scheduling delay:

Rely on HARQ retransmission;

More frequent CQI reporting;

Reduce code rate or payload size for FEC encode (back off);

Encoding with mother code in CU and rate matching in DU (PHYcell)

Figure 5:
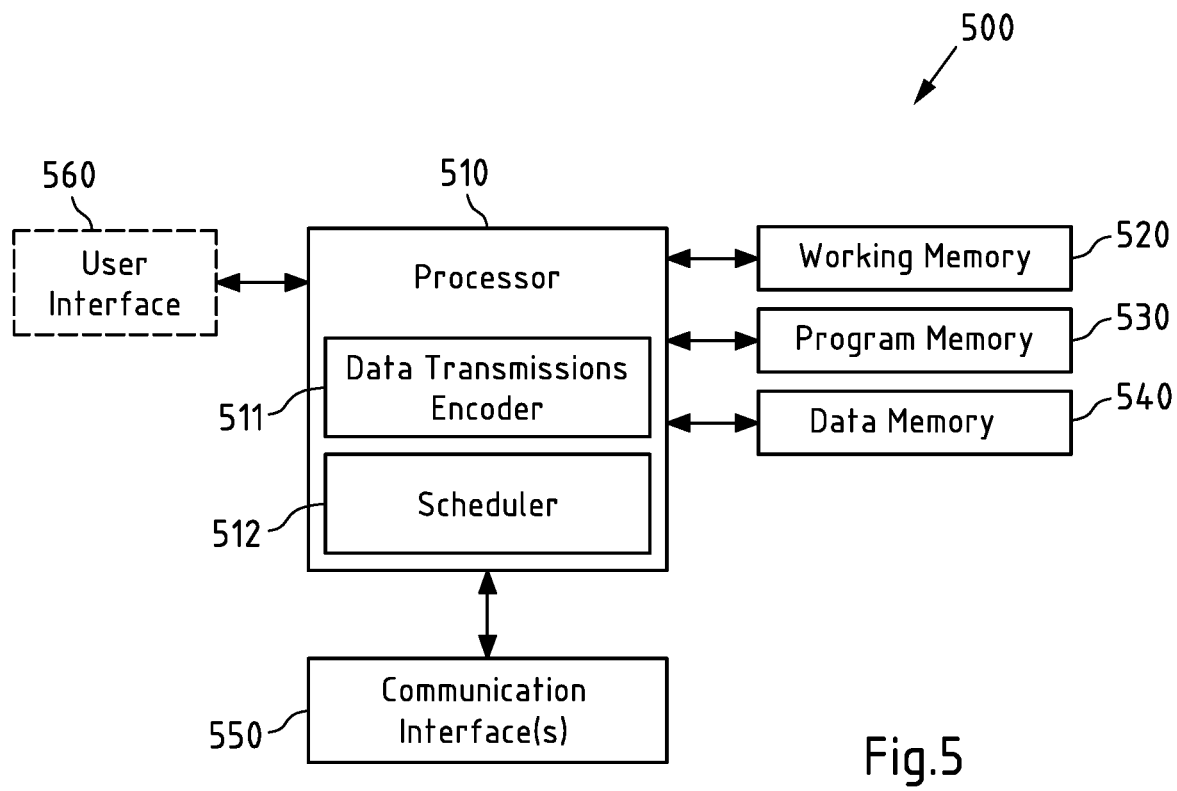
FIG. 5 a schematic block diagram of a first apparatus according to an exemplary aspect of the present invention.

FIG. 5 is a schematic block diagram of an apparatus 500 according to an exemplary aspect of the present invention, which may for instance represent the centralized unit 111 of FIG. 1.

Apparatus 500 comprises a processor 510, working memory 520, program memory 530, data memory 540, communication interface(s) 550, and an optional user interface 560.

Apparatus 500 may for instance be configured to perform and/or control or comprise respective means (at least one of 510 to 560) for performing and/or controlling the method according to the first exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first exemplary aspect of the invention of the present invention.

Processor 510 may for instance comprise a data transmissions encoder 511 as a functional and/or structural unit. Data transmissions encoder 511 may for instance be configured to encode data transmissions (see step 204 of FIG. 2). Processor 510 may for instance comprise a scheduler 512 as a functional and/or structural unit. Scheduler 512 may for instance be configured to schedule the tentative encoding (see step 203 of FIG. 2). Processor 510 may for instance further control the memories 520 to 540, the communication interface(s) 550, and the optional user interface 560.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance be a buffer, e.g. for at least temporarily storing received data transmission (see step 202 of FIG. 2).

Communication interface(s) 550 enable apparatus 500 to communicate with other entities, e.g. with one or more distributed units 112a and/or 112b of FIG. 2. The communication interface(s) 550 may for instance comprise a wireless interface, e.g. a cellular radio communication interface and/or a WLAN interface) and/or wire-bound interface, e.g. an Ethernet or optical fiber link, carrying bits or complex-valued symbols (e.g. CPRI), an IP-based interface, for instance to communicate with entities via the Internet. Communication interface(s) may enable apparatus 500 to communicate with other entities, for instance with mobile devices 130-1 to 130-3.

User interface 560 is optional and may comprise a display for displaying information to a user and/or an input device (e.g. a keyboard, keypad, touchpad, mouse, etc.) for receiving information from a user.

Some or all of the components of the apparatus 500 may for instance be connected via a bus. Some or all of the components of the apparatus 500 may for instance be combined into one or more modules.

Figure 6:
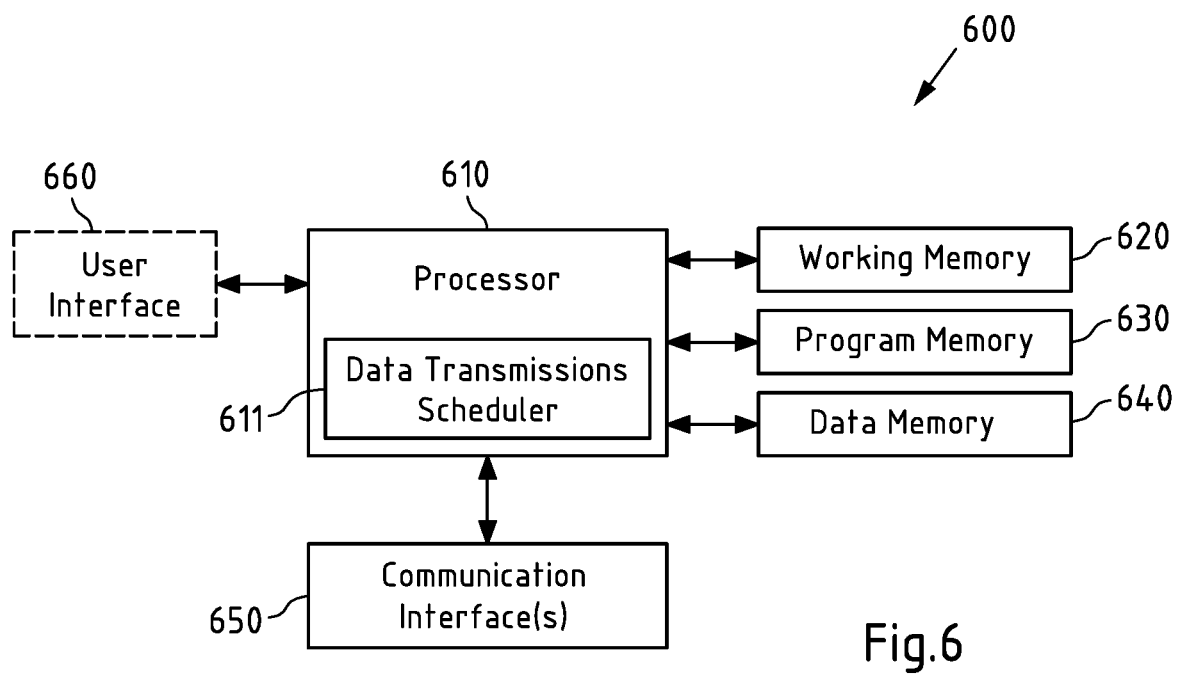
FIG. 6 a schematic block diagram of a second apparatus according to an exemplary aspect of the present invention.

FIG. 6 is a schematic block diagram of an apparatus 600 according to an exemplary aspect of the present invention, which may for instance represent one of the distributed units 112a or 112b of FIG. 2.

Apparatus 600 comprises a processor 610, working memory 620, program memory 630, data memory 640, communication interface(s) 650, and an optional user interface 660.

Apparatus 600 may for instance be configured to perform and/or control or comprise respective means (at least one of 610 to 660) for performing and/or controlling the method according to the second exemplary aspect of the present invention. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the second exemplary aspect of the invention of the present invention.

Processor 610 may for instance comprise a data transmission scheduler 611 as a functional and/or structural unit. Data transmission scheduler 611 may for instance be configured to schedule received and encoded data transmissions (see step 303 of FIG. 3). Processor 610 may for instance further control the memories 620 to 640, the communication interface(s) 650, and the optional user interface 660.

Processor 610 may for instance execute computer program code stored in program memory 630, which may for instance represent a computer readable storage medium comprising program code that, when executed by processor 610, causes the processor 610 to perform the method according to the second exemplary aspect of the present invention.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance be a buffer. Optionally, the data memory 640 may store received (encoded) data transmissions (see step 301 of FIG. 3), e.g. for scheduling the stored data transmissions. The data memory 640 as a buffer may for instance store the received (encoded) data transmissions at least temporarily, e.g. until the transmission of the scheduled data transmissions is completed.

Communication interface(s) 650 enable apparatus 600 to communicate with other entities, e.g. with centralized unit 111 of FIG. 1. The communication interface(s) 650 may for instance comprise a wireless interface, e.g. an Ethernet or optical fiber link, carrying bits or complex-valued symbols (e.g. CPRI), a cellular radio communication interface and/or a WLAN interface) and/or wire-bound interface, e.g. an IP-based interface, for instance to communicate with entities via the Internet. Communication interface(s) may enable apparatus 600 to communicate with other entities, for instance with mobile devices 130-1 to 130-3 of FIG. 1.

User interface 660 is optional and may comprise a display for displaying information to a user and/or an input device (e.g. a keyboard, keypad, touchpad, mouse, etc.) for receiving information from a user.

Some or all of the components of the apparatus 600 may for instance be connected via a bus. Some or all of the components of the apparatus 600 may for instance be combined into one or more modules.

Figure 7:
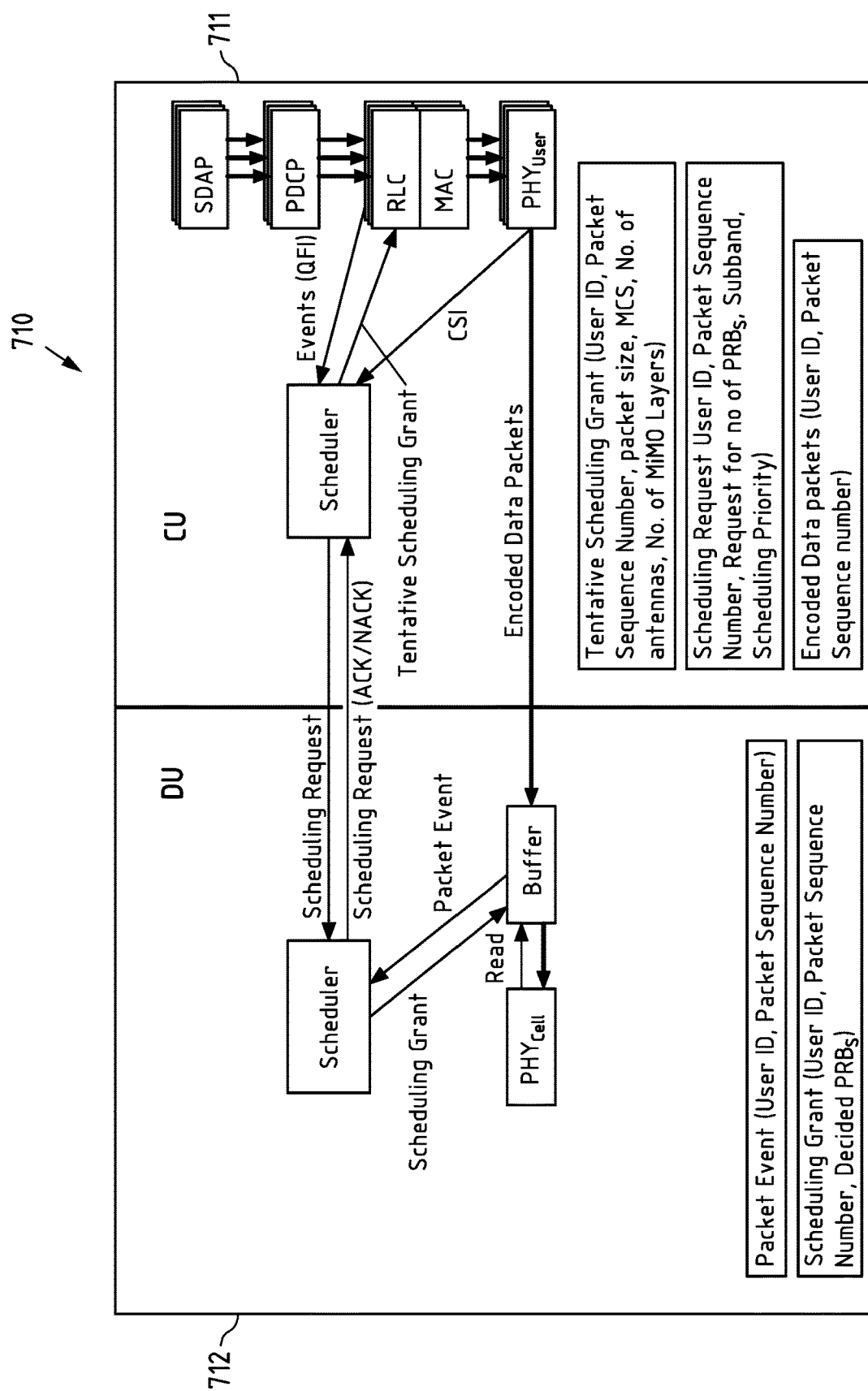
FIG. 7 a schematic block diagram of a first example architecture of a system according to an exemplary aspect of the present invention.

FIG. 7 illustrates a schematic block diagram of a first example architecture of a system according to an exemplary aspect of the present invention. In FIG. 7, a base station 710 (e.g. a gNB) is shown comprising a centralized unit 711 (referred to as CU in FIG. 7) and a distributed unit 712 (referred to as DU in FIG. 7).

FIG. 7 illustrates in more detail a possible implementation (see FIG. 4a) of a proposed CRAN architecture according to exemplary aspects of the present invention. A data plane processing (represented by blocks SDAP, PDCP, RLC, MAC and PHYuser) for the user (determined via a user ID) are performed in centralized unit 711. The scheduler in centralized unit 711 receives information from the data plane processing for the user concerning packet arrival events (e.g. from RLC) and respective QFI, as well as CSI (from PHYuser).

Based on the available information (e.g. obtained physical channel information; see step 202 of FIG. 2), the scheduler sends out a tentative scheduling grant to the data plane processing (e.g. RLC or PHYuser). The data plane processing follows the instructions, performs the tentative PHY encoding for one or a number of code and/or transport blocks and delivers the encoded code/transport blocks over the midhaul interface into a buffer in distributed unit 712.

The buffer entity in distributed unit 712 informs the scheduler of the distributed unit 712 (e.g. a FD scheduler) concerning the code/transport block arrival events. The scheduler takes the presence of the packet arrivals from centralized unit 711 into account for its scheduling decisions, selects time-frequency resources, e.g. a number PRBs (radio resources in more general) for these packets, and informs the distributed unit 712 data plane processing (i.e. PHY cell/buffer entity) by means of a scheduling grant on which time-frequency resources to map the packets.

A particularity of CRAN architecture according to FIG. 7 (referred to as Option 1) is given by the handshake signaling between the scheduler in centralized unit 711 and the scheduler in distributed unit 712. The code/transport blocks carried over the midhaul interface are identified e.g. by means of a user ID as well as a sequence number. A scheduling request is transmitted by the scheduler of the centralized unit 711 to request e.g. a preferred amount of radio resources (e.g. PRBs) and to indicate e.g. a preferred subband for transmitting of the data transmissions, optionally together with a scheduling priority. This scheduling request is acknowledged by the scheduler of the distributed unit 712 after receiving the packet arrival event containing the respective User ID and sequence number.

Figure 8:
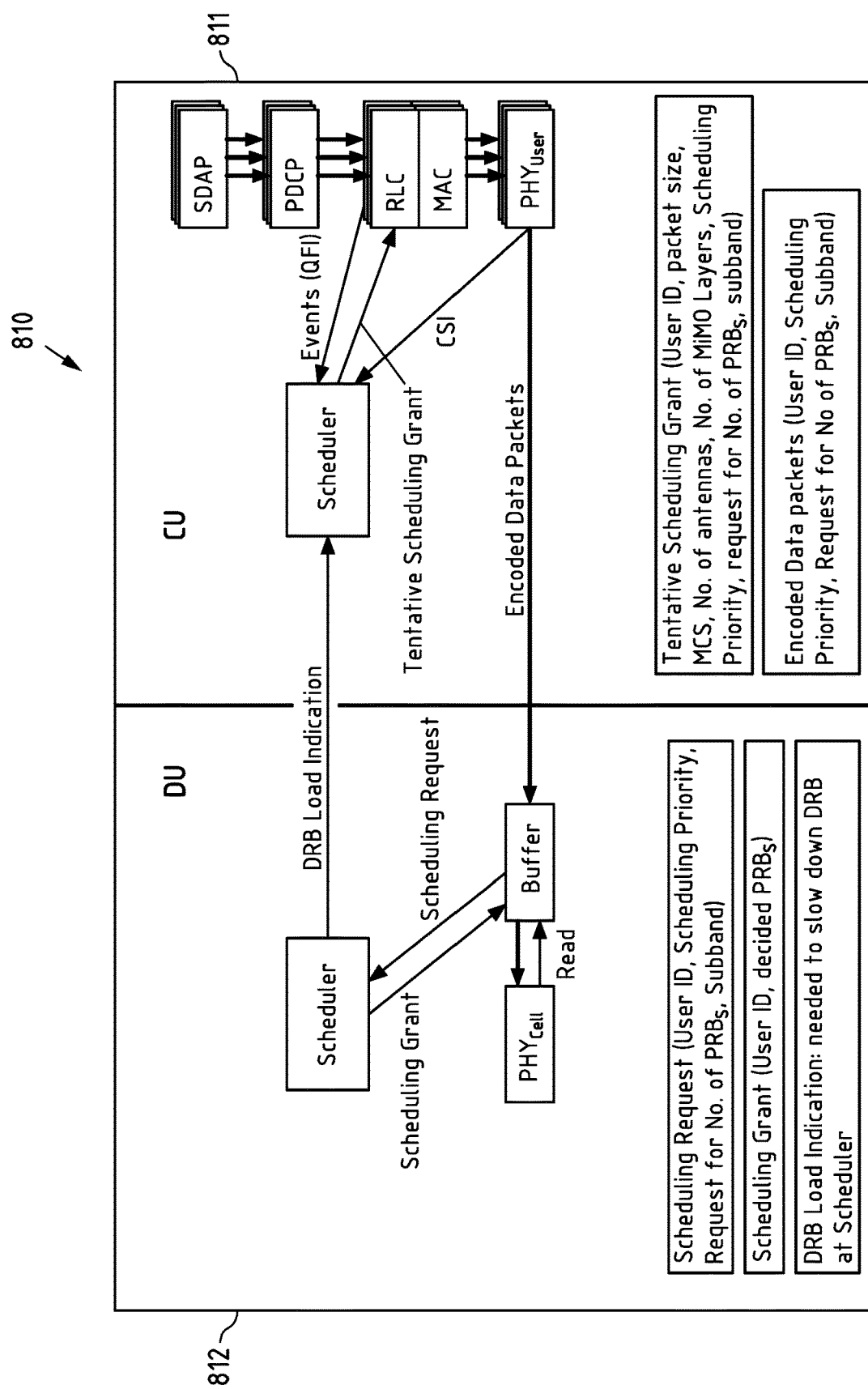
FIG. 8 a schematic block diagram of a second example architecture of a system according to an exemplary aspect of the present invention.

FIG. 8 illustrates a schematic block diagram of a second example architecture of a system according to an exemplary aspect of the present invention. In FIG. 8, a base station 810 (e.g. a gNB) is shown comprising a centralized unit 811 (referred to as CU in FIG. 8) and a distributed unit 812 (referred to as DU in FIG. 8).

FIG. 8 illustrates in more detail an alternative implementation of the proposed CRAN architecture compared to FIG. 7. A particularity of this CRAN architecture—also referred to as Option 2—is the absence of the handshake signaling between the scheduler in centralized unit 811 and the scheduler (e.g. a FD scheduler) in distributed unit 812. Instead the scheduler of the distributed unit 812 provides the scheduler of the centralized unit 811 with load information. This load information may for instance be related to a radio resource utilization of the entire cell (e.g. cell 120-1 or 120-2 of FIG. 1) and/or can be related with recommended upper load or number of PRBs for the respective user or Data Radio Bearer (DRB). There is also a control signaling flow from the scheduler of the centralized unit 811 to the scheduler of the distributed unit 812, carried within the encoded data packets (such as user ID, scheduling priority and request for preferred number of PRBs and list of preferred PRBs), and passed to the scheduler of the distributed unit 812 upon packet arrival in the data plane buffer of distributed unit 812.

Figure 9:
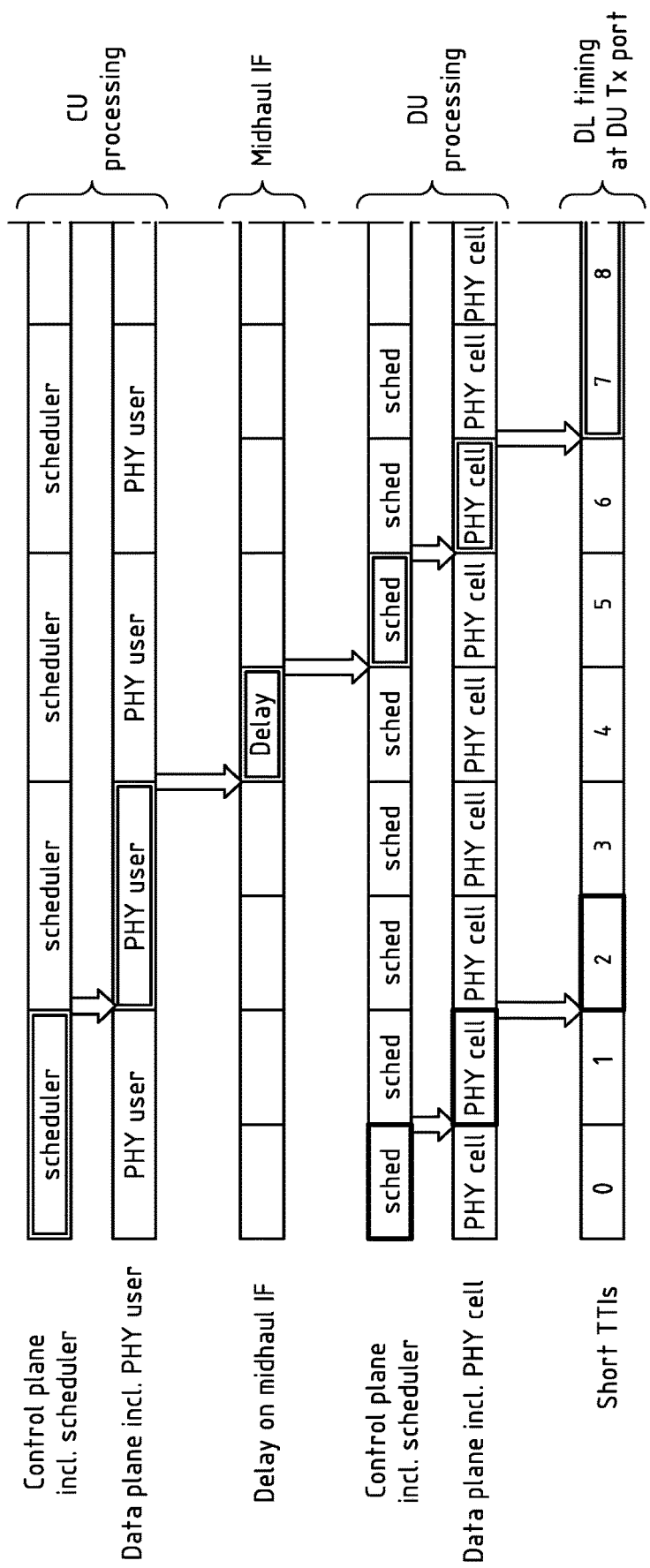
FIG. 9 a timing diagram of a system according to an exemplary aspect of the present invention.

FIG. 9 illustrates a timing diagram of a system according to an exemplary aspect of the present invention for the processing in centralized unit (referred to as CU in FIG. 9) and distributed unit (referred to as DU in FIG. 9) of exemplary embodiments according to the present invention.

It is assumed that DU performs the processing of low-latency traffic carried on short TTIs, for example, assume that DU has hardware capable to complete the entire control plane processing including the FD scheduler within one short TTI, and likewise the entire data plane processing including the SDAP/PDCP/RLC/MAC/PHY user and the PHYcell processing also within one short TTI. This is shown by the bold borders of the boxes in FIG. 9, e.g. for the transport blocks transmitted in short TTI #2 the control plane processing is performed in short TTI #0 and the user plane processing is performed in short TTI #1.

The processing of less latency critical traffic can be split between centralized unit and distributed unit as described above, e.g. a longer TTI equivalent to two short TTIs may be used for transmission. Therefore, the processing latencies in CU may for instance also be relaxed, e.g. assume that the control plane processing (excluding scheduler of the DU) is performed within one long TTI, and likewise the data plane processing (excluding PHYcell) is also performed within one long TTI. After completion of the control and data plane processing in CU, the encoded code/transport blocks are conveyed (e.g. transferred) to distributed unit, e.g. over a midhaul interface between the centralized unit and the distributed unit. This may for instance cause a delay, e.g. on the order of the short TTI length. In distributed unit, the processing of scheduler of the DU and PHYcell may for instance be carried out, each with a processing delay of another short TTI. This split processing is shown by double border of the boxes in FIG. 9, e.g. for the transport blocks transmitted in short TTIs #7 and #8 the control plane processing in centralized unit is performed in short TTIs #0 and #1, the user plane processing in centralized unit is performed in short TTIs #2 and #3, the midhaul interface delay corresponds to short TTI #4, and finally in distributed unit the scheduler is processed in short TTI #5 and PHY cell in short TTI #6.

Figure 10C:
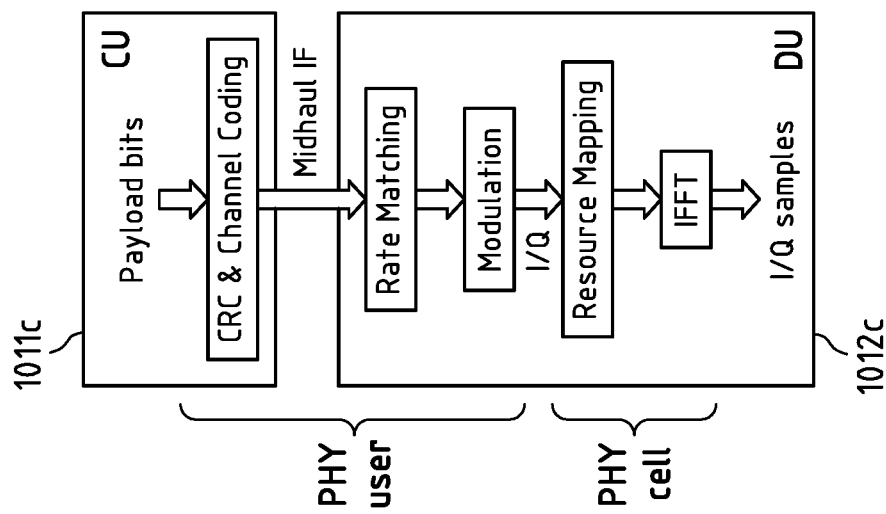
FIGS. 10a-10c respective schematic block diagrams of at least one base station that may for instance be utilized in a system according to an exemplary aspect of the present invention.
Figure 10B:
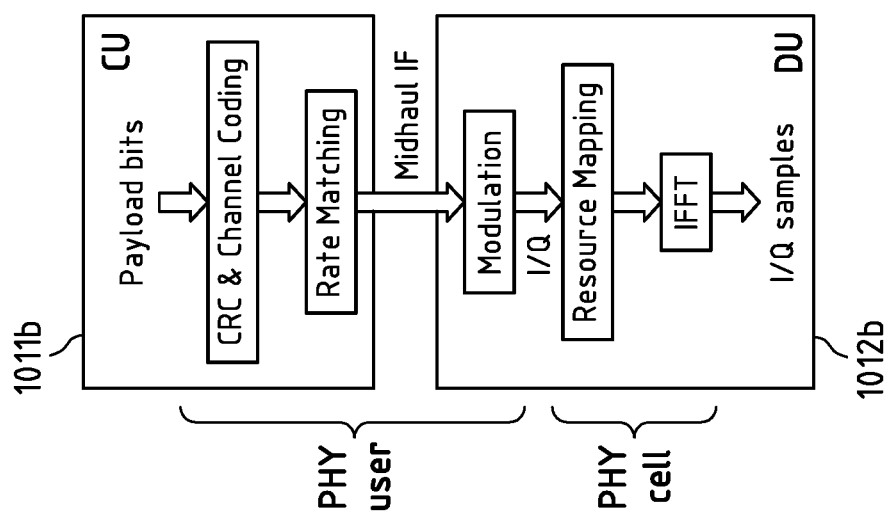
Figure 10A:
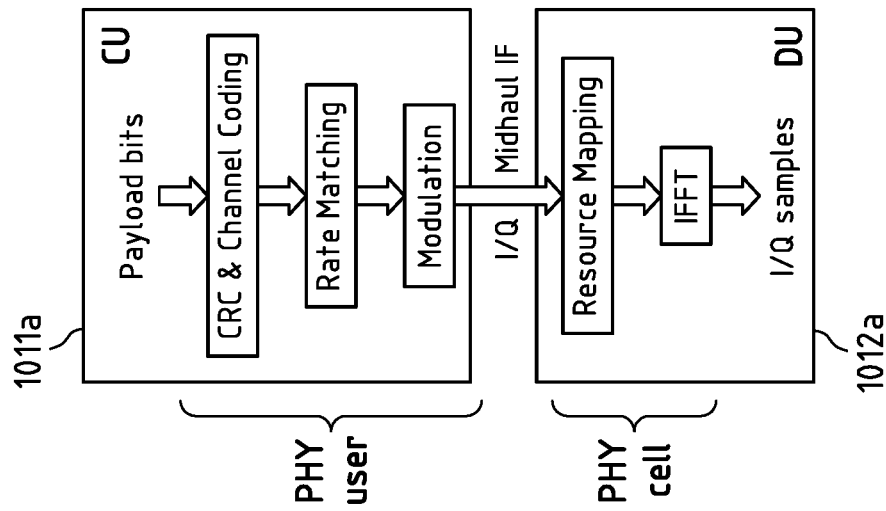

FIGS. 10a-10c respectively illustrate schematic block diagrams of base stations 1010a, 1010b, 1010c that may for instance be utilized in a system according to an exemplary aspect of the present invention.

FIGS. 10a-10c show further implementation options for the CRAN architecture, characterized by possible splitting of the PHYuser processing between centralized unit 1011a, 1011b, 1011c and distributed unit 1012a, 1012b, 1012c. The entire PHY processing may for instance be split into PHY-user, optionally with CRC attachment, channel coding, rate matching and modulation mapping as the major building blocks, and PHYcell with physical resource mapping (time-frequency resource mapping) and waveform generation (IFFT) as the major building blocks:

- In PHY split Option 1 (FIG. 10a), PHYuser processing is entirely in centralized unit 1011a and PHYcell processing is entirely in distributed unit 1012a. This option was assumed in FIGS. 7 and 8.
- In PHY split Option 2 (FIG. 10b), modulation mapping is shifted from centralized unit 1011b to distributed unit 1012b.
- In PHY split Option 3 (FIG. 10c), rate matching and modulation mapping are shifted from centralized unit 1011c to distributed unit 1012c.

With PHY spit Option 1, the midhaul interface carries complex-valued symbols in the frequency domain, often referred to frequency-domain I/Q samples, while it carries bits (0 or 1) with Options 2 and 3.

Advantages of PHY split Options 2 and 3 over Option 1 may be one or more of the following:

Reduced data rate on midhaul interface;

More scheduling flexibility for scheduler of the distributed unit, since this scheduler has more degree of freedom to adapt the number of allocated radio resources (PRBs) by modifying the rate matching and/or modulation scheme.

Advantage of PHY split Option 1 may further be a reduced processing burden for distributed unit 1012a compared to distributed units 1012b and 1012c. Further, PHY split Option 1 takes advantage of statistical multiplexing gains since the processing in CU is typically carried out for a plurality of (neighboring) cells.

The use of PHY split Option 2 or 3 in the embodiments shown and described with respect to FIGS. 7 and 8 may require some modifications of the control signaling between the entities.

Further, the proposed processing architectures may not be confined to split processing for CRAN. Instead, the processing principle of tentative encoding may for instance also be beneficial for implementation on a single hardware platform (e.g. without a midhaul Interface between centralized unit and distributed unit(s)), in particular as an enabler for the mixing of traffic on short TTIs and longer TTIs.

The following abbreviations are used with respect to the description of FIGS. 1 to 10c:

CU: centralized unit;
DU: distributed unit;
RF: Radio frequency;
PHYuser: physical channel for transmission of the encoded data transmissions;
Mu: MACuser;
Mc: MACcell;
Pc: PHYcell;
ENCuser: data transmissions are encoded;
TB: Transport Block;
CBG: Code Block Group;
CRC Cyclic Redundancy Check;
CSI Channel State Information;
DRB Data Radio Bearer;
QFI QoS Flow Identity;
QoS Quality of Service;
SDAP Service Data Adaptation Protocol;
PDCP Packet Data Convergence Protocol;
RLC Radio Link Control;
UE User equipment; and
TTI Transmission time interval.

The following embodiments shall also be considered to be disclosed:

Embodiment 1

A first apparatus comprising at least one processor and at least one memory including computer program code, the at least one memory and the computer program code configured to, with the at least one processor, cause the apparatus to at least perform:
receiving data transmissions indicative of data to be transmitted via the wireless communication network;
obtaining physical channel information indicative of one or more parameters representing channel information and/or quality information associated with at least one physical channel that can be used for transmitting the data transmissions to one or more mobile devices of the wireless communication network;
scheduling the data transmissions based at least partially on the physical channel information, wherein a tentative scheduling grant is determined for at least a part of the data transmissions to be encoded tentatively;
encoding at least a part of the data transmissions, wherein the encoding is performed and/or controlled in a tentative fashion upon reception of the data transmissions, wherein the data transmissions are encoded based on the tentative scheduling grant; and
outputting the encoded data transmissions upon completion of the encoding.

Embodiment 2

The apparatus according to embodiment 1, wherein the data transmissions are encoded tentatively based at least partially on a channel coding.

Embodiment 3

The apparatus according to embodiment 1 or embodiment 2, further comprising:
buffering the received data transmissions, wherein a size of a payload and a code rate are determined based at least partially on a filling state indicative of the amount of buffered data transmissions, wherein the tentative scheduling grant is determined further based on the size of the payload and the code rate, and wherein the data transmissions are encoded further based on the determined size of the payload and the code rate.

Embodiment 4

The apparatus according to any of preceding embodiments, wherein the encoding is performed and/or controlled further based on one or more encoding parameters of the following parameters i) to iii):
i) traffic load of the at least one cell; and
ii) traffic priorities associated with the data transmissions;
iii) maximum data rate or maximum number of physical channel resources associated with the data transmissions to the respective mobile device.

Embodiment 5

The apparatus according to any of preceding embodiments, the at least one memory and the computer program code configured to, with the at least one processor, cause the apparatus further to perform:
  obtaining channel quality information comprised by or being a part of the physical channel information indicative of one or more parameters representing a current state of the at least one physical channel;
    wherein the data transmissions are further scheduled based at least partially on the obtained channel quality.

Embodiment 6

The apparatus according to any of the preceding embodiments, wherein the encoding is performed and/or controlled further based on a back-off margin indicative of a reduced code rate and/or size of the payload.

Embodiment 7

The apparatus according to embodiment 6, wherein the back-off margin is determined based at least partially on the physical channel information and/or traffic load of the at least one cell.

Embodiment 8

The apparatus according to any of the preceding embodiments, wherein the buffering comprises storing the received data transmissions in a buffer, wherein the filling state resulting from the buffering is represented by the amount of data transmissions that are stored in the buffer in relation to a total amount of data that can be stored in the buffer.

Embodiment 9

The apparatus according to any of the preceding embodiments, wherein the tentative encoding is enabled by a forward error correction encoding.

Embodiment 10

The apparatus according to any of the preceding embodiments, wherein each of the encoded data transmissions is outputted together with a respective control information indicative of a user identifier enabling the respective data transmissions to be transmitted to a corresponding mobile device.

Embodiment 11

The apparatus according to embodiment 10, wherein the respective control information is further indicative of received data transmissions that are to be transferred to the one or more mobile devices.

Embodiment 12

The apparatus according to any of the preceding embodiments, wherein at least a part of the data transmissions is enabled to be carried on short Transmission-Time-Intervals and at least a further part of the data transmissions is enabled to be carried on longer Transmission-Time-Intervals compared to the short Transmission-Time-Intervals.

Embodiment 13

A second apparatus comprising at least one processor and at least one memory including computer program code, the at least one memory and the computer program code configured to, with the at least one processor, cause the apparatus to at least perform:
  receiving data transmissions, wherein the data transmissions are encoded;
  buffering the encoded data transmissions;
  scheduling the data transmissions to be transferred to at least one mobile device, wherein the data transmissions are scheduled based at least partially on a Transmission Time Interval-by-Transmission Time Interval basis, wherein the scheduling is performed and/or controlled upon reception of the data transmissions; and
  transmitting the data transmissions based on the scheduling upon completion of the scheduling for the at least one cell.

Embodiment 14

The apparatus according to embodiment 13, wherein the scheduling is enabled by a frequency-domain scheduling.

Embodiment 15

The apparatus according to embodiment 13 or embodiment 14, wherein the at least one memory and the computer program code configured to, with the at least one processor, cause the apparatus further to perform during the scheduling:
  associating each of received data transmissions with a respective radio resource allocation information indicative of a physical resource that can be utilized for the transmission of the scheduled data transmissions.

Embodiment 16

The apparatus according to embodiment 15, wherein the physical resource is at least one physical channel that can be utilized to transmit data packets in a time- and/or frequency domain.

Embodiment 17

The apparatus according to any of the embodiments 13 to 16, wherein the data transmissions are transmitted based on the respective radio resource allocation information that enables at least a part of the data transmissions to be mapped by a data processing plane comprised or being a part of the distributed unit.

Embodiment 18

The apparatus according to any of the embodiments 13 to 17, wherein the scheduling is performed based at least partially on one or more scheduling parameters, wherein the one or more scheduling parameters represent or comprise one or more of the following parameters i) to iii):
  i) a modulation scheme;
  ii) a time duration of the Transmission Time Interval;
  iii) a selection of one or more Physical Resource Blocks.

Embodiment 19

The apparatus according to any of the embodiments 13 to 18, wherein the scheduling of the data transmissions further comprises:
generating a plurality of code block groups forming a single transport block based at least partially on the received data transmissions, wherein each of the generated plurality of code block groups is scheduled individually.

Embodiment 20

The apparatus according to any of the embodiments 15 to 19, wherein the at least one memory and the computer program code configured to, with the at least one processor, cause the apparatus further to perform during the scheduling:
determining one or more rate matching parameters indicative of a number of bits that can be transmitted based at least partially on the radio resource allocation information, wherein the data transmissions are transmitted corresponding to this number of bits.

Embodiment 21

The apparatus according to any of the embodiments 13 to 20, wherein the at least one memory and the computer program code configured to, with the at least one processor, cause the apparatus further to perform:
gathering resource information indicative of available resources that can be utilized for the outputting of data transmissions to one or more mobile device; and
outputting the resource information.

Embodiment 22

The apparatus according to any of the embodiments 13 to 21, wherein at least a part of the data transmissions is enabled to be carried on short Transmission-Time-Intervals and at least a further part of the data transmissions is enabled to be carried on longer Transmission-Time-Intervals compared to the short Transmission-Time-Intervals.

Embodiment 23

A first method, performed by a centralized unit of at least one cell of a wireless communication network, the method comprising:
receiving data transmissions indicative of data to be transmitted via the wireless communication network;
obtaining physical channel information indicative of one or more parameters representing channel information and/or quality information associated with at least one physical channel that can be used for transmitting the data transmissions to one or more mobile devices of the wireless communication network;
scheduling the data transmissions based at least partially on the physical channel information, wherein a tentative scheduling grant is determined for at least a part of the data transmissions to be encoded tentatively;
encoding at least a part of the data transmissions, wherein the encoding is performed and/or controlled in a tentative fashion upon reception of the data transmissions, wherein the data transmissions are encoded based on the tentative scheduling grant; and
outputting the encoded data transmissions upon completion of the encoding.

Embodiment 24

The method according to embodiment 23, wherein the data transmissions are encoded tentatively based at least partially on a channel coding.

Embodiment 25

The method according to embodiment 23 or embodiment 24, further comprising:
buffering the received data transmissions, wherein a size of a payload and a code rate are determined based at least partially on a filling state indicative of the amount of buffered data transmissions, wherein the tentative scheduling grant is determined further based on the size of the payload and the code rate, and wherein the data transmissions are encoded further based on the determined size of the payload and the code rate.

Embodiment 26

The method according to any of the embodiments 23 to 25, wherein the encoding is performed and/or controlled further based on one or more encoding parameters of the following parameters i) to iii):
i) traffic load of the at least one cell; and
ii) traffic priorities associated with the data transmissions;
iii) maximum data rate or maximum number of physical channel resources associated with the data transmissions to the respective mobile device.

Embodiment 27

The method according to any of the embodiments 23 to 26, further comprising:
obtaining channel quality information comprised by or being a part of the physical channel information, wherein the channel quality information is indicative of one or more parameters representing a current state of the at least one physical channel;
wherein the data transmissions are further scheduled based at least partially on the obtained channel quality information.

Embodiment 28

The method according to any of the embodiments 23 to 27, wherein the encoding is performed and/or controlled further based on a back-off margin indicative of a reduced code rate and/or size of the payload.

Embodiment 29

The method according to embodiment 28, wherein the back-off margin is determined based at least partially on the physical channel information and/or traffic load of the at least one cell.

Embodiment 30

The method according to any of the embodiments 23 to 29, wherein the buffering comprises storing the received data transmissions in a buffer, wherein the filling state resulting from the buffering is represented by the amount of data transmissions that are stored in the buffer in relation to a total amount of data that can be stored in the buffer.

Embodiment 31

The method according to any of the embodiments 23 to 30, wherein the tentative encoding is enabled by a forward error correction encoding.

Embodiment 32

The method according to any of the embodiments 23 to 31, wherein each of the encoded data transmissions is outputted together with a respective control information indicative of a user identifier enabling the respective data transmissions to be transmitted to a corresponding mobile device.

Embodiment 33

The method according to embodiment 32, wherein the respective control information is further indicative of received data transmissions that are to be transferred to the one or more mobile devices.

Embodiment 34

The method according to any of the embodiments 23 to 33, wherein at least a part of the data transmissions is enabled to be carried on short Transmission-Time-Intervals and at least a further part of the data transmissions is enabled to be carried on longer Transmission-Time-Intervals compared to the short Transmission-Time-Intervals.

Embodiment 35

A second method, performed by at least one distributed unit of at least one cell of a wireless communication network, the method comprising:
receiving data transmissions, wherein the data transmissions are encoded;
buffering the encoded data transmissions;
scheduling the data transmissions to be transferred to at least one mobile device, wherein the data transmissions are scheduled based at least partially on a Transmission Time Interval-by-Transmission Time Interval basis, wherein the scheduling is performed and/or controlled upon reception of the data transmissions; and
transmitting the data transmissions based on the scheduling upon completion of the scheduling for the at least one cell.

Embodiment 36

The method according to embodiment 35, wherein the scheduling is enabled by a frequency-domain scheduling.

Embodiment 37

The method according to embodiment 35 or embodiment 36, wherein the scheduling further comprises:
associating each of received data transmissions with a respective radio resource allocation information indicative of a physical resource that can be utilized for the transmission of the scheduled data transmissions.

Embodiment 38

The method according to embodiment 37, wherein the physical resource is at least one physical channel that can be utilized to transmit data packets in a time- and/or frequency domain.

Embodiment 39

The method according to any of the embodiments 35 to 38, wherein the data transmissions are transmitted based on the respective radio resource allocation information that enables at least a part of the data transmissions to be mapped by a data processing plane comprised or being a part of the distributed unit.

Embodiment 40

The method according to any of the embodiments 35 to 39, wherein the scheduling is performed based at least partially on one or more scheduling parameters, wherein the one or more scheduling parameters represent or comprise one or more of the following parameters i) to iii):
i) a modulation scheme;
ii) a time duration of the Transmission Time Interval;
iii) a selection of one or more Physical Resource Blocks.

Embodiment 41

The method according to any of the embodiments 35 to 40, wherein the scheduling of the data transmissions further comprises:
generating a plurality of code block groups forming a single transport block based at least partially on the received data transmissions, wherein each of the generated plurality of code block groups is scheduled individually.

Embodiment 42

The method according to any of the embodiments 35 to 41, wherein the scheduling further comprises:
determining one or more rate matching parameters indicative of a number of bits that can be transmitted based at least partially on the radio resource allocation information allocation, wherein the data transmissions are transmitted corresponding to this number of bits.

Embodiment 43

The method according to any of the embodiments 35 to 42, further comprising:
gathering resource information indicative of available resources that can be utilized for the outputting of data transmissions to one or more mobile device; and
outputting the resource information.

Embodiment 44

The method according to any of the embodiments 35 to 43, wherein at least a part of the data transmissions is enabled to be carried on short Transmission-Time-Intervals and at least a further part of the data transmissions is enabled to be carried on longer Transmission-Time-Intervals compared to the short Transmission-Time-Intervals.

Embodiment 45

A first apparatus comprising at least one processor and at least one memory including computer program code, the at least one memory and the computer program code configured to, with the at least one processor, cause the first apparatus to at least perform the steps of the first method of any of the embodiments 23 to 34.

Embodiment 46

A second apparatus comprising at least one processor and at least one memory including computer program code, the at least one memory and the computer program code configured to, with the at least one processor, cause the second apparatus to at least perform the steps of the second method of any of the embodiments 35 to 44.

Embodiment 47

A first computer program, the computer program when executed by a processor causing an apparatus to perform and/or control the actions of the first method according to any of the embodiments 23 to 34.

Embodiment 48

A second computer program, the computer program when executed by a processor causing an apparatus to perform and/or control the actions of the second method according to any of the embodiments 35 to 44.

Embodiment 49

A first tangible computer-readable medium storing computer program code, the computer program code when executed by a processor causing an apparatus to perform and/or control the actions of the first method according to any of the embodiments 23 to 34.

Embodiment 50

A second tangible computer-readable medium storing computer program code, the computer program code when executed by a processor causing an apparatus to perform and/or control the actions of the second method according to any of the embodiments 35 to 44.

Embodiment 51

A system, comprising:
at least one first apparatus according to embodiment 45; and
at least one second apparatus according to embodiment 46.

Embodiment 52

The system according to embodiment 51, wherein the at least one first apparatus and the at least one second apparatus enable a splitting of steps to be carried out with respect to a physical layer that is used between the at least one cell and a respective mobile device of a user, and a physical layer that is used between the distributed unit and the centralized unit of the at least one cell.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:
1. A method, comprising:
receiving data transmissions by at least one distributed unit of at least one cell of a wireless communication network, from a centralized unit of the at least one cell, wherein the data transmissions are encoded in a tentative fashion by the centralized unit, and wherein the encoding is performed or controlled without obtaining of a scheduling decision of the at least one distributed unit prior to the encoding;

buffering the encoded data transmissions;
scheduling the data transmissions to be transferred to at least one mobile device, wherein the data transmissions are scheduled based at least partially on a Transmission Time Interval-by-Transmission Time Interval basis, wherein the scheduling is performed or controlled upon reception of the data transmissions; and
transmitting the data transmissions based on the scheduling upon completion of the scheduling for the at least one cell.

2. The method according to claim 1, wherein the scheduling is enabled by a frequency-domain scheduling.

3. The method according to claim 1, wherein the scheduling further comprises:
associating each of received data transmissions with a respective radio resource allocation information indicative of a physical resource that can be utilized for the transmission of the scheduled data transmissions.

4. The method according to claim 3, wherein the physical resource is at least one physical channel that can be utilized to transmit data packets in a time—or frequency domain.

5. The method according to claim 1, wherein the scheduling is performed based at least partially on one or more scheduling parameters, wherein the one or more scheduling parameters represent or comprise one or more of the following parameters i) to iii):
  i) a modulation scheme;
  ii) a time duration of the Transmission Time Interval;
  iii) a selection of one or more Physical Resource Blocks.

6. The method according to claim 1, wherein the scheduling of the data transmissions further comprises:
generating a plurality of code block groups forming a single transport block based at least partially on the received data transmissions, wherein each of the generated plurality of code block groups is scheduled individually.

7. The method according to claim 3, wherein the scheduling further comprises:
determining one or more rate matching parameters indicative of a number of bits that can be transmitted based at least partially on the radio resource allocation information, wherein the data transmissions are transmitted corresponding to this number of bits.

8. The method according to claim 1, further comprising:
gathering resource information indicative of available resources that can be utilized for the outputting of data transmissions to one or more mobile device; and
outputting the resource information.

9. The method according to claim 1, wherein at least a part of the data transmissions is enabled to be carried on short Transmission-Time-Intervals and at least a further part of the data transmissions is enabled to be carried on longer Transmission-Time-Intervals compared to the short Transmission-Time-Intervals.

10. An apparatus comprising at least one distributed unit of at least one cell of a wireless communication network, further comprising:
at least one processor; and
at least one memory including computer program code;
the at least one memory and the computer program code configured to, with the at least one processor, cause the apparatus at least to perform:
receiving data transmissions by the at least one distributed unit of the at least one cell, from a centralized unit of the at least one cell, wherein the data transmissions are encoded in a tentative fashion by the centralized unit, and wherein the encoding is performed or controlled without obtaining of a scheduling decision of the at least one distributed unit prior to the encoding;
buffering the encoded data transmissions;
scheduling the data transmissions to be transferred to at least one mobile device, wherein the data transmissions are scheduled based at least partially on a Transmission Time Interval-by-Transmission Time Interval basis, wherein the scheduling is performed or controlled upon reception of the data transmissions; and
transmitting the data transmissions based on the scheduling upon completion of the scheduling for the at least one cell.

11. A system, comprising:
a first apparatus comprising at least one distributed unit of at least one cell of a wireless communication network, further comprising
at least one processor; and
at least one memory including instructions that, when executed by the at least one processor, cause the first apparatus at least to perform:
receiving data transmissions by the at least one distributed unit of the at least one cell, from a centralized unit of the at least one cell, wherein the data transmissions are encoded in a tentative fashion by the centralized unit, and wherein the encoding is performed or controlled without obtaining of a scheduling decision of the at least one distributed unit prior to the encoding;
buffering the encoded data transmissions;
scheduling the data transmissions to be transferred to at least one mobile device, wherein the data transmissions are scheduled based at least partially on a Transmission Time Interval-by-Transmission Time Interval basis, wherein the scheduling is performed or controlled upon reception of the data transmissions; and
transmitting the data transmissions based on the scheduling upon completion of the scheduling for the at least one cell;
and
a second apparatus comprising the centralized unit of the at least one cell, further comprising:
at least one additional processor; and
at least one additional memory including additional instructions that, when executed by the at least one additional processor, cause the second apparatus at least to perform:
receiving data transmissions, at the centralized unit of the at least one cell, indicative of data to be transmitted via the wireless communication network;
obtaining physical channel information indicative of one or more parameters representing channel information or quality information associated with at least one physical channel that can be used for transmitting the data transmissions to one or more mobile devices of the wireless communication network;
buffering the received data transmissions, wherein a size of a payload and a code rate are determined based at least partially on a filling state indicative of the amount of buffered data transmissions;
scheduling the data transmissions based at least partially on the physical channel information, wherein a tentative scheduling grant is determined for at least a part of the data transmissions to be encoded tentatively;

encoding at least a part of the data transmissions, wherein the encoding is performed or controlled in a tentative fashion upon reception of the data transmissions, wherein the data transmissions are encoded based on the tentative scheduling grant, wherein the tentative scheduling grant is determined further based on the size of the payload and the code rate, and wherein the data transmissions are encoded further based on the determined size of the payload and the code rate; and outputting the encoded data transmissions upon completion of the encoding.

\* \* \* \* \*